United States Patent
Engerman

(10) Patent No.: US 11,274,735 B2
(45) Date of Patent: Mar. 15, 2022

(54) DRIVE AXLE WITH A DISCONNECT DEVICE

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 17 days.

(21) Appl. No.: 16/801,623

(22) Filed: Feb. 26, 2020

(65) Prior Publication Data

US 2020/0278013 A1 Sep. 3, 2020

Related U.S. Application Data

(60) Provisional application No. 62/811,603, filed on Feb. 28, 2019.

(51) Int. Cl.
| | |
|---|---|
| *F16H 37/04* | (2006.01) |
| *B60K 6/26* | (2007.10) |
| *B60K 6/365* | (2007.10) |
| *B60K 17/02* | (2006.01) |
| *F16D 25/08* | (2006.01) |
| *B60K 1/00* | (2006.01) |
| *B60K 6/547* | (2007.10) |

(52) U.S. Cl.
CPC ............. *F16H 37/041* (2013.01); *B60K 1/00* (2013.01); *B60K 6/26* (2013.01); *B60K 6/365* (2013.01); *B60K 6/547* (2013.01); *B60K 17/02* (2013.01); *F16D 25/08* (2013.01); *B60K 2001/001* (2013.01); *B60K 2001/006* (2013.01); *B60Y 2200/91* (2013.01); *B60Y 2200/92* (2013.01); *B60Y 2400/73* (2013.01); *F16H 2702/02* (2013.01)

(58) Field of Classification Search
CPC . B60K 1/00; B60K 6/26; B60K 6/365; B60K 6/547; B60K 17/02; B60K 2001/001; B60K 2001/006; B60K 2007/0092; F16H 2048/201; F16H 2048/204; F16H 48/22; F16H 48/24; F16H 48/26; F16H 48/27; F16D 25/08

See application file for complete search history.

(56) References Cited

U.S. PATENT DOCUMENTS

| | | | | |
|---|---|---|---|---|
| 3,361,008 | A * | 1/1968 | Fallon | F16H 48/22 475/88 |
| 3,724,289 | A * | 4/1973 | Kennicutt | F16H 48/08 475/88 |
| 4,805,486 | A * | 2/1989 | Hagiwara | F16H 48/08 475/150 |
| 5,591,098 | A * | 1/1997 | Jones | F16H 48/08 475/231 |
| 5,989,147 | A | 11/1999 | Forrest et al. | |
| 6,015,361 | A | 1/2000 | Yamazaki et al. | |
| 6,699,151 | B2 | 3/2004 | Grogg et al. | |
| 7,681,675 | B2 | 3/2010 | Samie et al. | |
| 8,308,598 | B2 | 11/2012 | Pritchard et al. | |

(Continued)

*Primary Examiner* — Tisha D Lewis
(74) *Attorney, Agent, or Firm* — McCoy Russell LLP

(57) ABSTRACT

An electric drive axle including an electric motor, a gear arrangement, a differential, and a disconnect device at least partially disposed within a differential case. The gear arrangement is configured to produce a certain gear ratio between the electric motor and the differential.

15 Claims, 20 Drawing Sheets

(56) References Cited

U.S. PATENT DOCUMENTS

| | | | |
|---|---|---|---|
| 8,584,786 B2 | 11/2013 | Grogg | |
| 8,808,127 B2 | 8/2014 | Seidl et al. | |
| 10,525,810 B2 * | 1/2020 | Jegebris | B60K 17/08 |
| 2002/0198076 A1 | 12/2002 | Bryson et al. | |
| 2007/0023211 A1 * | 2/2007 | Keller | B60K 17/046 180/65.6 |
| 2011/0252906 A1 * | 10/2011 | Harashima | F16H 57/0483 74/325 |
| 2011/0269593 A1 | 11/2011 | Knowles et al. | |
| 2015/0080166 A1 | 3/2015 | Forrest et al. | |
| 2016/0138695 A1 * | 5/2016 | Tronnberg | F16H 48/36 475/150 |

\* cited by examiner

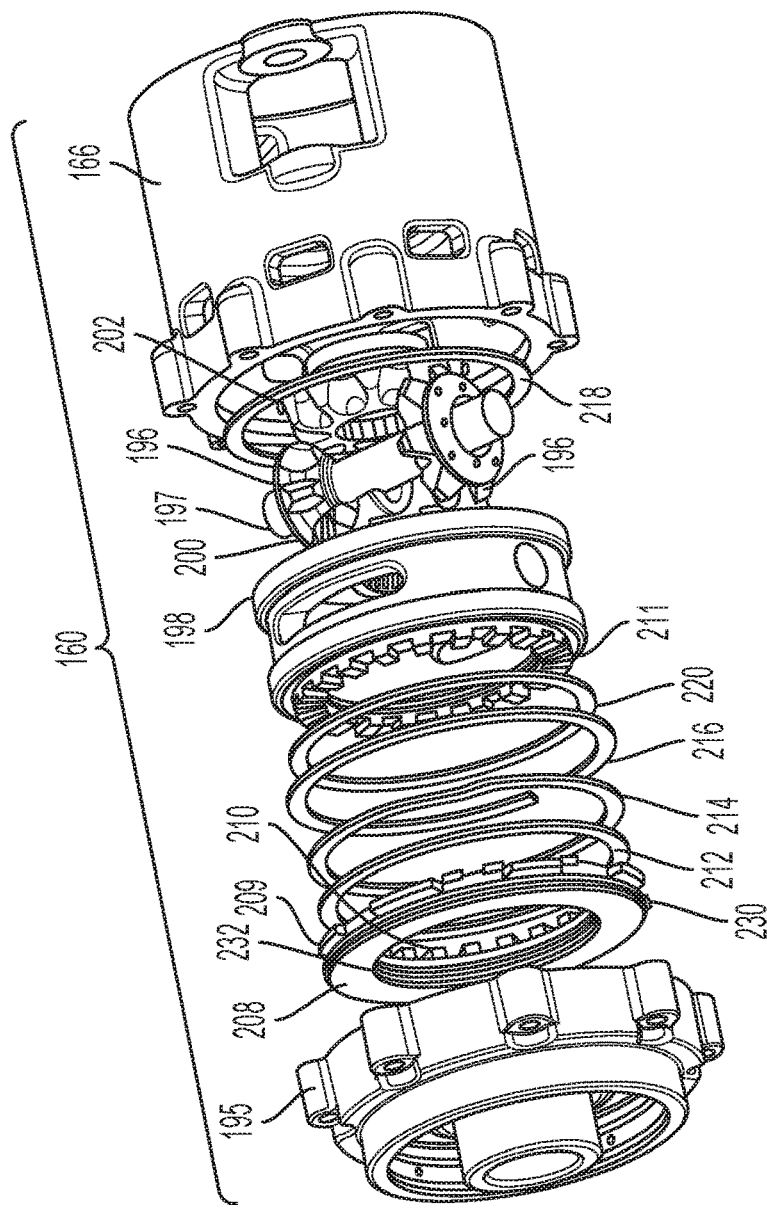
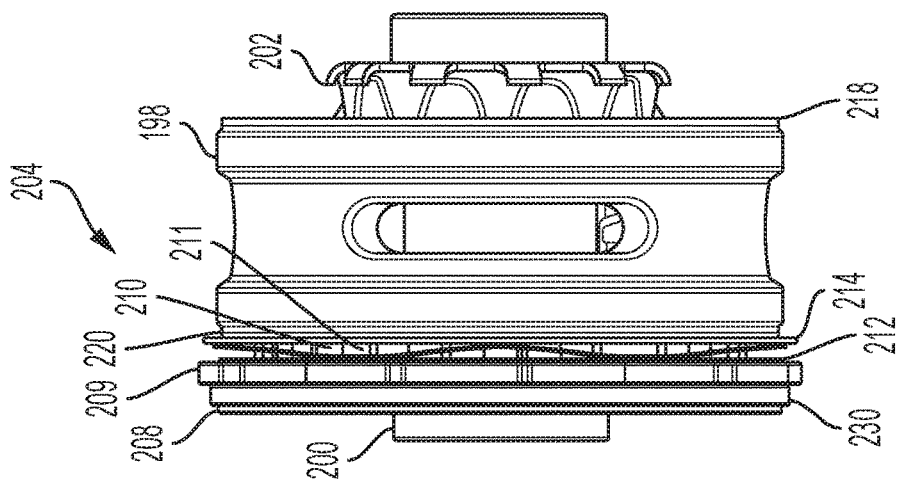
FIG. 8
FIG. 7

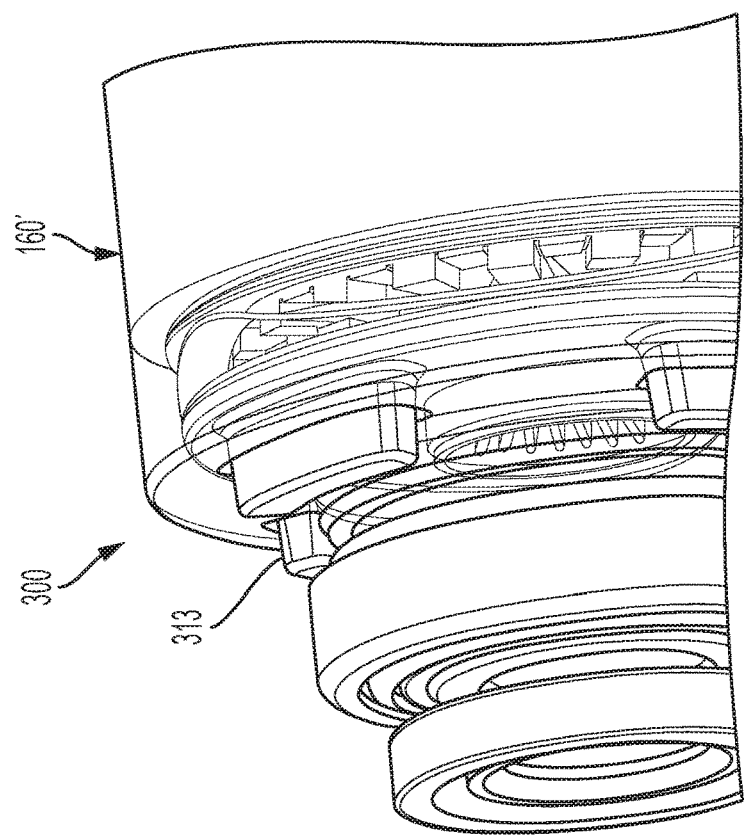
FIG. 16
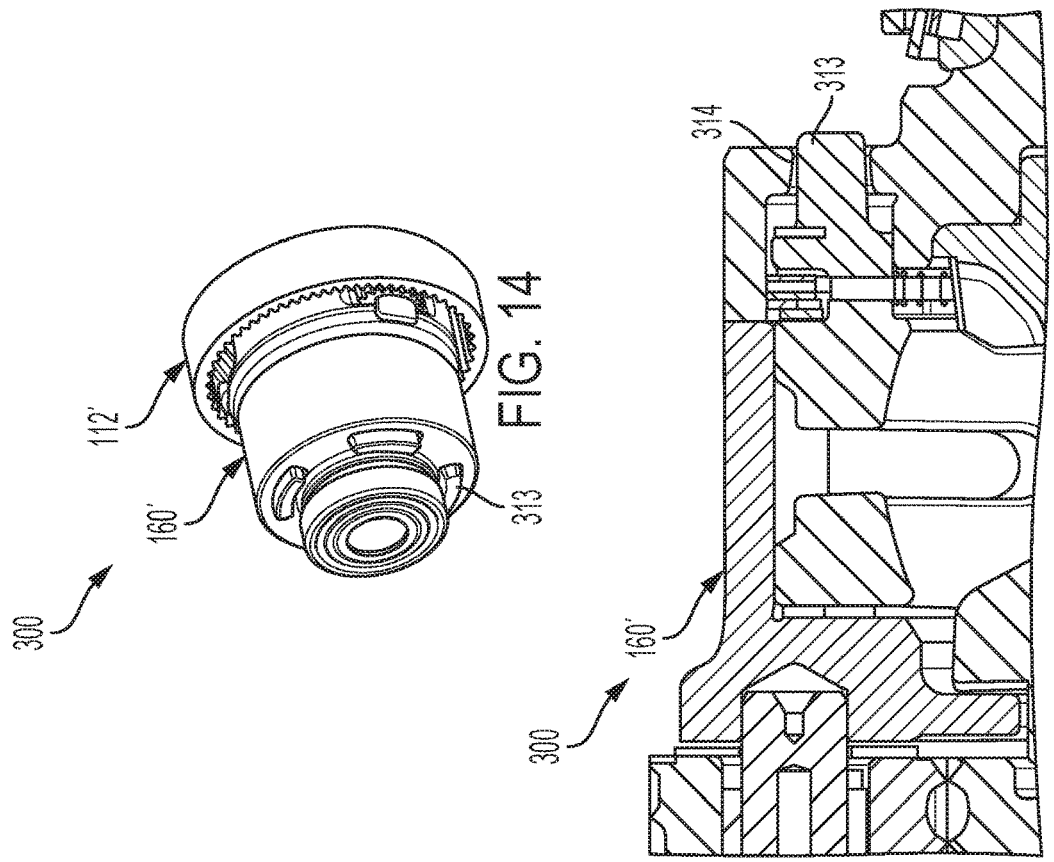
FIG. 14
FIG. 15

DRIVE AXLE WITH A DISCONNECT DEVICE

CROSS-REFERENCE TO RELATED APPLICATIONS

The present application claims priority to U.S. Provisional Application No. 62/811,603, entitled "DRIVE AXLE WITH A DISCONNECT DEVICE", and filed on Feb. 28, 2019. The entire contents of the above-listed application are hereby incorporated by reference for all purposes.

TECHNICAL FIELD

The present disclosure relates to electric drive axles, and more particularly to an electric drive axle with a disconnect device.

BACKGROUND AND SUMMARY

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

A disconnect device for decoupling the electric motor from the vehicle wheels such that the vehicle speed is not limited by the electric motor may be desirable in some applications. In view of the above, there remains a need for an electric drive axle disconnect device that does not require complicated and expensive components.

It would be desirable to produce an electric drive axle having a disconnect device that remains compact in size and weight.

In concordance and agreement with the present disclosure, an electric drive axle having a disconnect device that remains compact in size and weight, has been discovered.

The present disclosure provides for an electric drive axle. In one embodiment, an electric drive axle, comprises an electric motor, a gear arrangement, a differential, and a disconnect device, wherein the gear arrangement is configured to produce a certain gear ratio between the electric motor and the differential.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 7 is a side elevational view of a disconnect device of the differential shown in FIGS. 5-6.

FIG. 8 is an exploded view of the disconnect device shown in FIG. 7.

FIG. 14 is a perspective view of a portion of the differential of the electric drive axle shown in FIGS. 12-13.

FIG. 15 is an enlarged sectional view of a portion of the differential of the electric drive axle shown in FIGS. 12-14.

FIG. 16 is an enlarged perspective view of the portion of the differential of the electric drive axle shown in FIG. 14.

DETAILED DESCRIPTION

Figure 1:
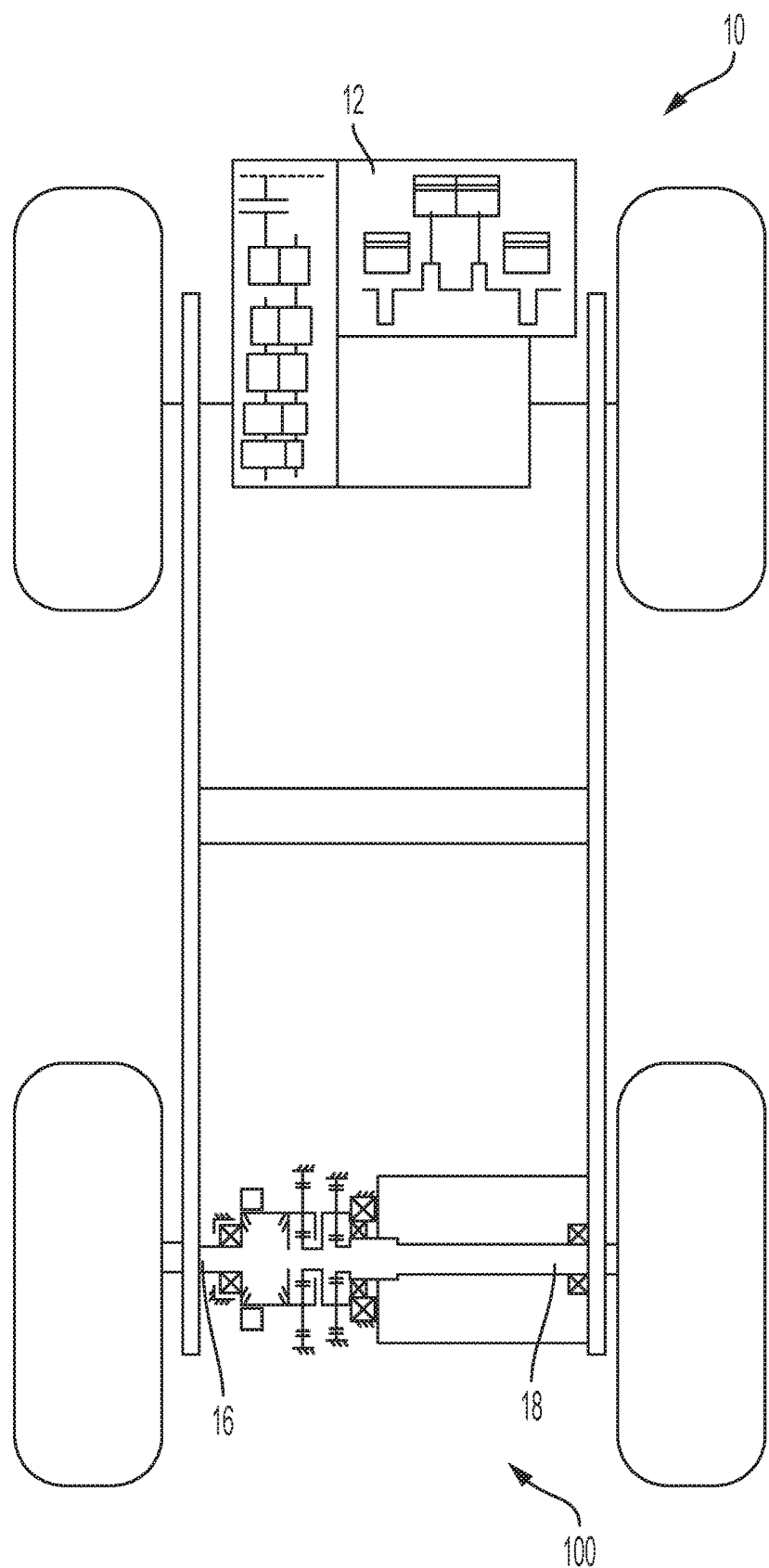
FIG. 1 is a schematic diagram of a vehicle driveline according to an embodiment of the presently disclosed subject matter.

It is to be understood that the disclosure may assume various alternative orientations and step sequences, except where expressly specified to the contrary.

It is also to be understood that the specific assemblies and systems illustrated in the attached drawings, and described in the following specification are simply exemplary embodiments of the concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle 100 are described below. In certain embodiments, the electric drive axle 100 is utilized with a pure electric vehicle (not depicted) where the electric drive axle 100 is the only driving axle. In other embodiments, as illustrated in FIG. 1, the electric drive axle is utilized with a hybrid four-wheel-drive vehicle 10 where the front axle is driven by an internal combustion engine 12, and the rear axle is the electric drive axle 100 (or vice versa). In still other embodiments, the electric drive axle 100 is utilized in a hybrid commercial vehicle (not depicted) comprising a tandem axle in which the front tandem axle is driven by an internal combustion engine, and the rear tandem axle is the electric drive axle 100 (or vice versa). The electric drive axle 100 may have applications in commercial vehicles, both light duty and heavy duty vehicles, and for passenger, off-highway, and sport utility vehicles. Additionally, the electric drive axle 100 described herein may be adapted for use in front and/or rear driving axles, and in steerable and non-steerable axles. It would be understood by one of ordinary skill in the art that the electric drive axle 100 also has industrial, locomotive, military, agricultural, and aerospace applications.

Figure 2:
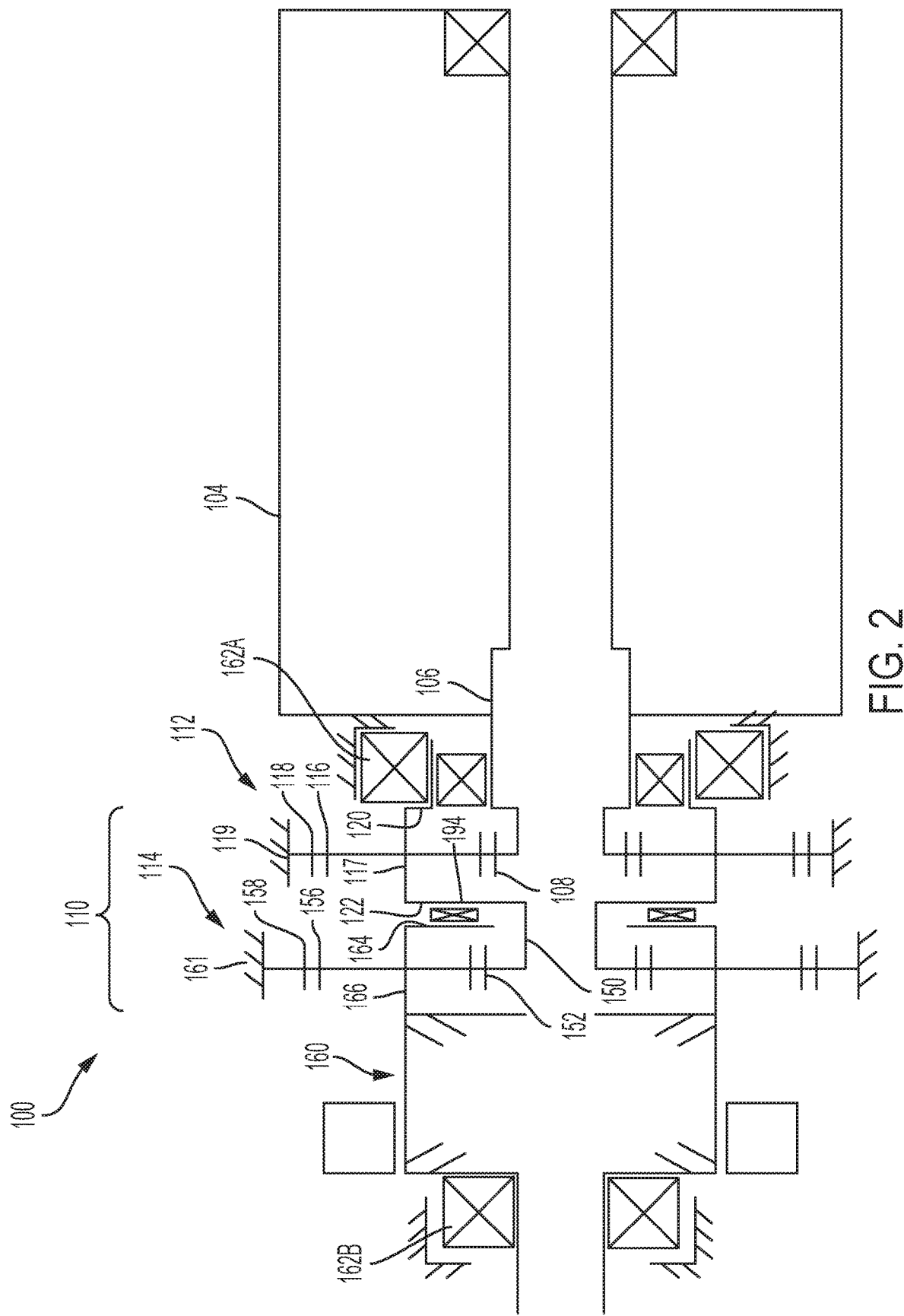
FIG. 2 is a schematic diagram which illustrates a portion of an electric drive axle of the driveline shown in FIG. 1 including an electric motor, a first planetary gear system, a second planetary gear system, and a differential.
Figure 3:
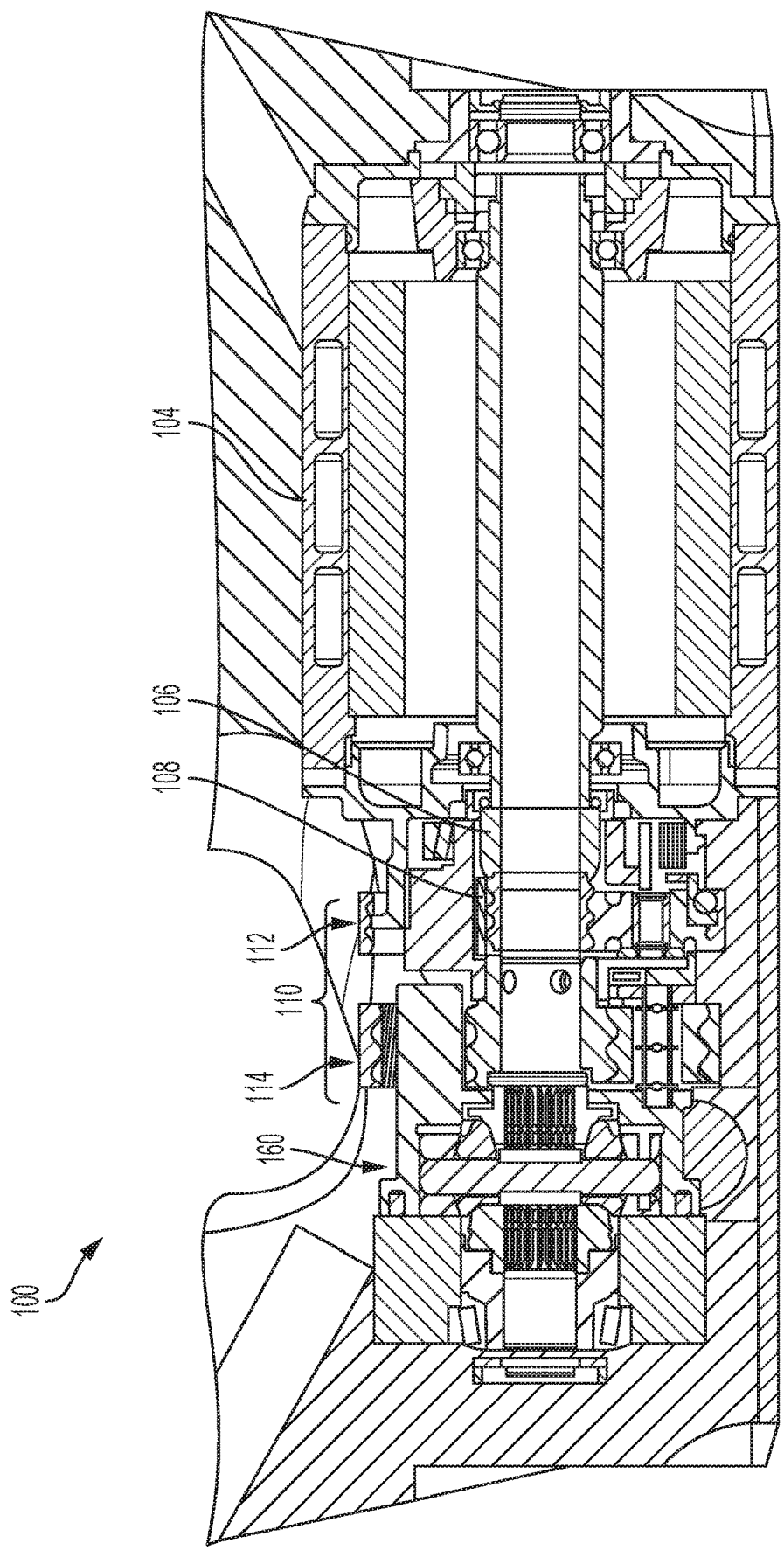
FIG. 3 is a cross-sectional view of the portion of the electric drive axle shown in FIG. 2, wherein a disconnect device of the differential is not shown.
Figure 4:
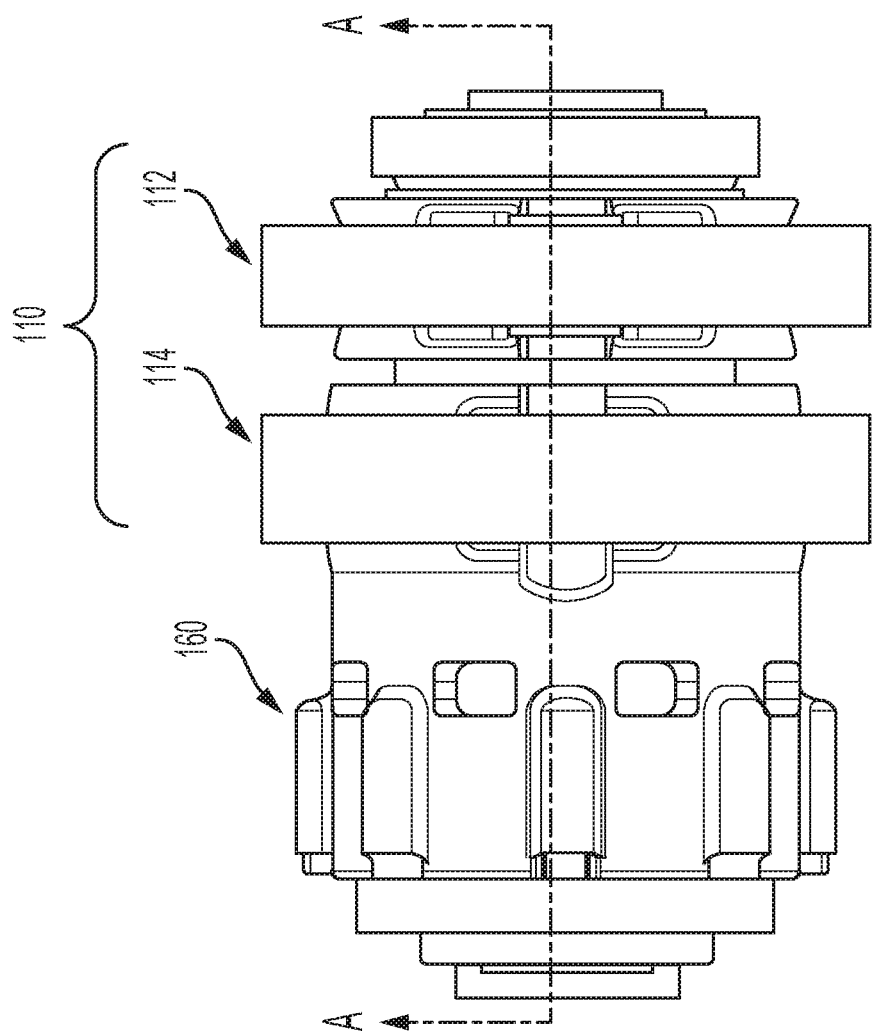
FIG. 4 is a side elevational view of a portion of the electric drive axle of the driveline shown in FIG. 1 according to an embodiment of the disclosure.

In one embodiment illustrated in FIGS. 2-3, the electric drive axle 100 may comprise an integrated drive system. In an embodiment, the electric drive axle 100 includes an electric motor 104 (e.g., electromotor) coupled with a power source (not depicted). The electric motor 104 may be a permanent magnet synchronous machine comprising a stator disposed concentrically about a rotor. The electric drive axle 100 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil. The electric drive may have either a co-axial (as shown) or off axis layout where the axle shaft connecting the wheel to the differential does not pass through the center or the motor but rather parallel to the motor axis.

A motor output shaft 106 is coupled with the rotor of the electric motor 104 for rotation therewith. A first gear 108 is coupled with the motor output shaft 106. The electric motor 104 drives a gear arrangement 110 via the motor output shaft 106 and the first gear 108. In an embodiment, as illustrated in FIGS. 2-3, the gear arrangement 110 is disposed co-axial with the motor output shaft 106. As illustrated in FIGS. 2 and 3, the gear arrangement 110 comprises a first planetary gear system 112 and a second planetary gear system 114. The first planetary gear system 112 includes the first gear 108 (which operates as a sun gear), a plurality of planet gears 116 mounted on a carrier 117 and an annulus 118. The first planetary gear system 112 is configured to produce a certain gear ratio. In certain embodiments, the first planetary gear system 112 is configured to produce a reduction in the gear ratio between the electric motor 104 and the second planetary gear system 114. It is understood, however, that the reduction in the gear ratio of the first planetary gear system 112 depends upon which one of the planet gears 116, and the annulus 118 is operatively connected to the first gear 108, which one of the first gear 108, the planet gears 116, and the annulus 118 is stationary, and which one of the first gear 108, the planet gears 116, and the annulus 118 is operatively connected to the second planetary gear system 114.

In the embodiments shown in FIGS. 2-13, the planet gears 116 are operatively connected to the second planetary system 114 via the carrier 117, and the annulus 118 is stationary and fixedly mounted on a housing 119. For example, the annulus 118 may be fixedly mounted on the axle housing, if desired. In the embodiment shown, the first planetary gear system 112 includes three equally circumferentially spaced planet gears 116 mounted on the carrier 117. It is understood, however, that the first planetary gear system 112 can include any number and size of planet gears 116 as desired. One of ordinary skill in the art should further understand that the planet gears 116 may be mounted at various other positions on the carrier 117. As illustrated, each of the planet gears 116 is in meshed engagement with the first gear 108 and the annulus 118. Various methods of meshed engagement between each of the planet gears 116, the first gear 108, and the annulus 118 can be employed as desired.

In certain embodiments, the carrier 117 includes a first end plate 120, a second end plate 122 spaced apart from the first end plate 120, and a web 123 formed therebetween. As more clearly shown in FIG. 5, each of the end plates 120, 122 includes a plurality of apertures 124, 126, respectively, formed therein. The apertures 124 formed in the first end plate 120 are aligned with the apertures 126 formed in the second end plate 122. Additionally, the web 123 may be formed with recesses (not shown) at angularly spaced locations aligned with the apertures 124, 126 to allow at least a portion of the planet gears 116 to protrude therefrom. In the embodiment shown, the end plates 120, 122 each include three equally circumferentially spaced apertures 124, 126, respectively, formed therein. It is understood, however, that the end plates 120, 122 can include any number and size of apertures 124, 126 and the web 123 can include any number and size of recesses, as desired. One of ordinary skill in the art should further understand that the apertures 124, 126 may be formed at various other positions in the respective end plates 120, 122, and the recesses (not shown) may be formed at various other positions in the web 123.

Figure 5:
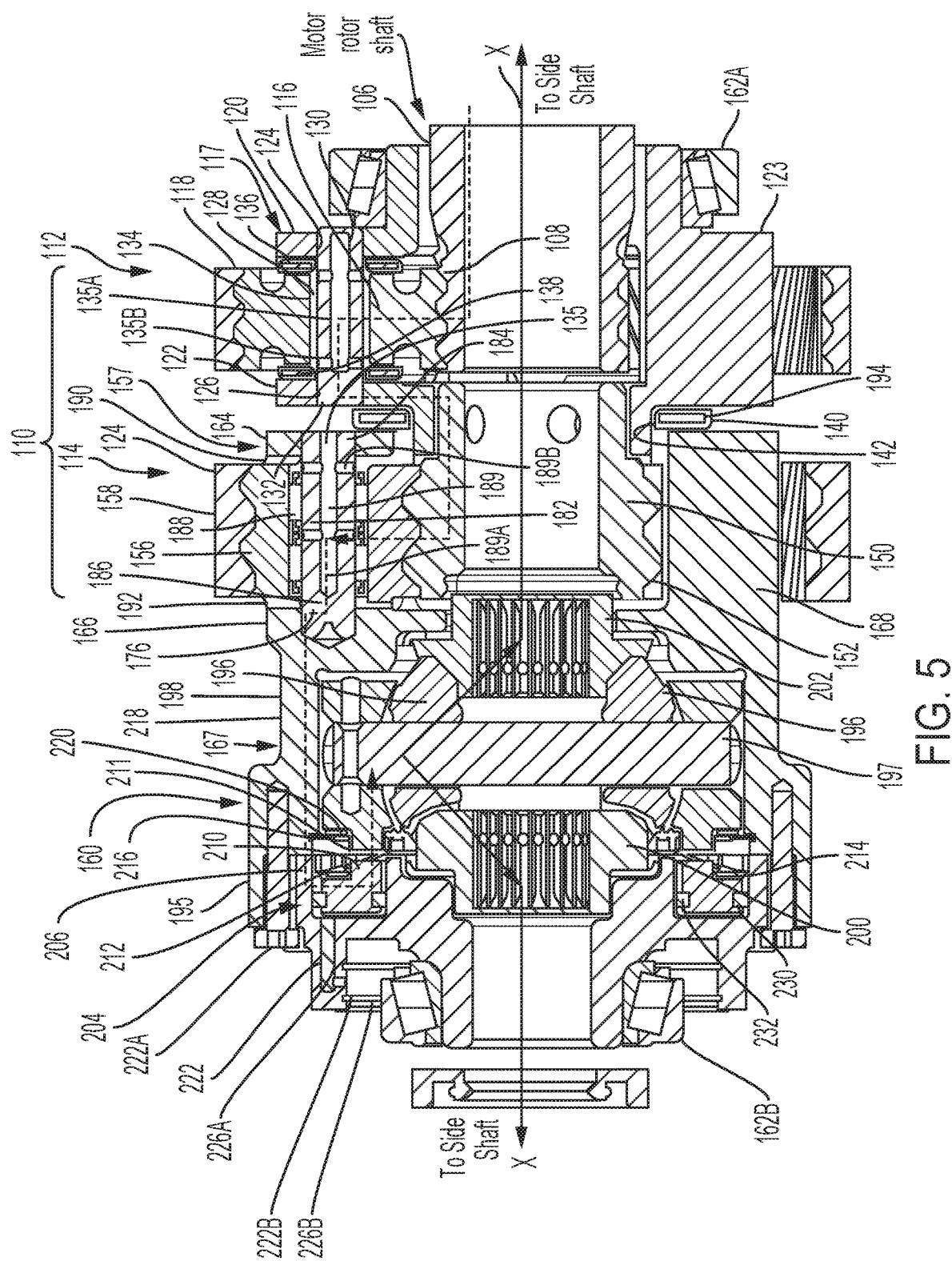
FIG. 5 is a cross-sectional view of the portion of the electric drive axle shown in FIG. 4 taken along section line A-A.

The first planetary gear system 112 shown further includes a plurality of pinion shafts 128. Each of the pinion shafts 128 is disposed axially through one of the planet gears 116 and supported at respective ends 130, 132 thereof by a pair of the apertures 124, 126 formed in the respective end plates 120, 122 of the carrier 117. The pinion shafts 128 may be coupled to the carrier 117 by any device or method as desired such as being press fit into the apertures 124, 126 or secured by a pin, for example. A needle bearing 134, shown in FIG. 5, is radially disposed on an outer periphery of each of the pinion shafts 128. Each of the planet gears 116 is rotatably supported on the outer periphery of each of the pinion shafts 128 by the needle bearing 134. In certain embodiments, each of the pinion shafts 128 has a generally cylindrical shape. It is understood, however, that the pinion shafts 128 can have other shapes and sizes as desired.

As more clearly illustrated in FIG. 5, at least one of the pinion shafts 128 may include at least one fluid conduit 135 formed therein. In certain embodiments, each of the pinion shafts 128 includes at least one first fluid conduit 135A formed to extend axially therethrough and at least one second fluid conduit 135B formed to extend radially from the at least one first fluid conduit 135A to an outer peripheral surface thereof. The fluid conduits 135A, 135B permit a flow of a fluid (e.g. a lubricant) from a fluid source (not shown) to within the first planetary gear system 112 to provide lubrication thereto. It should be appreciated that any number, size, and shape of fluid conduit 135 may be formed in any of the pinion shafts 128 as desired.

In certain embodiments, the first planetary gear system 112 further includes a first thrust member 136 and a second thrust member 138. The thrust members 136, 138 are configured to minimize friction and excessive wear between the planet gears 116 and the carrier 117. In the certain embodiments, each of the thrust members 136, 138 is a generally circular-shaped disc having an axial cylindrical bore formed therethrough. It is understood that each of the thrust members 136, 138 can have various shapes and sizes as desired. As illustrated in FIG. 5, the first thrust member 136 is disposed about each of the pinion shafts 128 and interposed between the first end plate 120 of the carrier 117 and at least one of the planet gears 116. Similarly, the second thrust member 138 is disposed about each of the pinion shafts 128 and interposed between the second end plate 122 of the carrier 117 and at least one of the planet gears 116. As shown, each of the planet gears 116, the carrier 117, and the thrust members 136, 138 may have at least one substantially planar face. It is understood, however, that each of the planet gears 116, the carrier 117, and the thrust members 136, 138 may have at least one face including various patterns and configurations of channels formed therein and protuberances formed thereon.

As more clearly shown in FIG. 5, the carrier 117 further includes an annular hub 140 extending axially outwardly from an outer surface of the second end plate 122. The annular hub 140 includes a plurality of splines 142 or a connector (not shown) formed on an inner peripheral surface thereof. Although the annular hub 140 shown is integrally formed on the carrier 117, it is understood that it can be coupled to the second end plate 122 as a separate and distinct component of the carrier 117, if desired. The annular hub 140 is disposed concentrically about an idler shaft 150. In certain embodiments, the idler shaft 150 includes a plurality of splines 151 formed on an outer peripheral surface thereof. As depicted, the first planetary gear system 112 is operatively connected to the second planetary gear system 114. In certain embodiments, a splined connection is formed between planetary gear systems 112, 114 having the splines 142 of the annular hub 140 meshed with the splines 151 of the idler shaft 150.

Now with regards to the second planetary gear system 114. The second planetary gear system 114 includes a second gear 152 (which operates as a sun gear) coupled with the idler shaft 150, a plurality of planet gears 156 mounted on a carrier 157 and an annulus 158. The second planetary gear system 114 is configured to produce a certain gear ratio. In certain embodiments, the second planetary gear system 114 is configured to produce a reduction in the gear ratio between the first planetary gear system 112 and a differential 160. It is understood, however, that the reduction in the gear ratio of the second planetary gear system 114 depends upon which one of the second gear 152, the planet gears 156, and the annulus 158 is operatively connected to the first planetary gear system 112, which one of the second gear 152, the planet gears 156, and the annulus 158 is stationary, and which one of the second gear 152, the planet gears 156, and the annulus 158 is operatively connected to the differential 160.

In the embodiments shown in FIGS. 2-13, the planet gears 156 are operatively connected to the differential 160 via the carrier 157, and the annulus 158 is stationary and fixedly mounted on a housing 161. For example, the annulus 158 may be fixedly mounted on the axle housing, if desired. In the embodiment shown, the second planetary gear system 114 includes three equally circumferentially spaced planet gears 156 mounted on the carrier 157. It is understood, however, that the second planetary gear system 114 can include any number and size of planet gears 156 as desired. One of ordinary skill in the art should further understand that the planet gears 156 may be mounted at various other positions on the carrier 157. As illustrated, each of the planet gears 156 is in meshed engagement with the second gear 152 and the annulus 158. Various methods of meshed engagement between each of the planet gears 156, the second gear 152, and the annulus 158 can be employed as desired.

In certain embodiments, the carrier 157 includes a first end plate 164, a first portion 166 of a differential case 167 spaced apart from the first end plate 164, and a web 168, shown in FIG. 5, formed therebetween. Accordingly, the carrier 157 of the second planetary gear system 114 is integrally formed with the differential 160. As illustrated in FIG. 5, each of the first end plate 164 and the first portion 166 of the differential case 167 includes a plurality of apertures 174, 176, respectively, formed therein. The apertures 174 formed in the first end plate 164 are aligned with the apertures 176 formed in the first portion 166 of the differential case 167. Additionally, the web 168 may be formed with recesses (not shown) at angularly spaced locations aligned with the apertures 174, 176 to allow at least a portion of the planet gears 156 to protrude therefrom. In the embodiment shown, the first end plate 164 and the first portion 166 of the differential case 167 each includes three equally circumferentially spaced apertures 174, 176, respectively, formed therein. It is understood, however, that the first end plate 164 and the first portion 166 of the differential case 167 can include any number and size of apertures 174, 176 and the web 168 can include any number and size of recesses, as desired. One of ordinary skill in the art should further understand that the apertures 174, 176 may be formed at various other positions in the respective first end plate 164 and the first portion 166 of the differential case 167, and the recesses (not shown) may be formed at various other positions in the web 168.

The second planetary gear system 114 show further includes a plurality of pinion shafts 182. Each of the pinion shafts 182 is disposed axially through one of the planet gears 156 and supported at respective ends 184, 186 thereof by a pair of the apertures 174, 176 formed in the respective first end plate 164 of the carrier 157 and the first portion 166 of the differential case 167. The pinion shafts 182 may be coupled to the carrier 157 and the differential case 167 by any device or method as desired such as being press fit into the apertures 174, 176 or secured by a pin, for example. A pair of needle bearings 188, shown in FIG. 5, is radially disposed on an outer periphery of each of the pinion shafts 182. Each of the planet gears 156 is rotatably supported on the outer periphery of each of the pinion shafts 182 by the needle bearings 188. In certain embodiments, each of the pinion shafts 182 has a generally cylindrical shape. It is understood, however, that the pinion shafts 182 can have other shapes and sizes as desired.

As more clearly illustrated in FIG. 5, at least one of the pinion shafts 182 may include at least one fluid conduit 189 formed therein. In certain embodiments, each of the pinion shafts 182 includes at least one first fluid conduit 189A formed to extend axially therethrough and at least one second fluid conduit 189B formed to extend radially from the at least one first fluid conduit 189A to an outer peripheral surface thereof. The fluid conduits 189A, 189B permit a flow of a fluid (e.g. a lubricant) from a fluid source (not shown) to within the second planetary gear system 114 to provide lubrication thereto. It should be appreciated that any number, size, and shape of fluid conduit 189 may be formed in any of the pinion shafts 182 as desired.

In certain embodiments, the second planetary gear system 114 further includes a first thrust member 190 and a second thrust member 192. The thrust members 190, 192 are configured to minimize friction and excessive wear between the planet gears 156, the first end plate 164 of the carrier 157, and the first portion 166 of the differential case 167. In the certain embodiments, each of the thrust members 190, 192 is a generally circular-shaped disc having an axial cylindrical bore formed therethrough. It is understood that each of the thrust members 190, 192 can have various shapes and sizes as desired. As illustrated in FIG. 5, the first thrust member 190 is disposed about each of the pinion shafts 182 and interposed between the first end plate 165 of the carrier 157 and at least one of the planet gears 156. Similarly, the second thrust member 192 is disposed about each of the pinion shafts 182 and interposed between the portion 166 of the differential 160 and at least one of the planet gears 156. As shown, each of the planet gears 156, the first end plate 164 of the carrier 157, the first portion 166 of the differential case 167, and the thrust members 190, 192 may have at least one substantially planar face. It is understood, however, that each of the planet gears 156, the first end plate 164 of the carrier 157, the first portion 166 of the differential case 167, and the thrust members 190, 192 may have at least one face including various patterns and configurations of channels formed therein and protuberances formed thereon.

A thrust element 194 is disposed between the first planetary gear system 112 and the second planetary gear system 114. The thrust element 194 is configured to minimize friction and excessive wear between the second thrust member 122 of the carrier 117 and the first end plate 164 of the carrier 157. In the certain embodiments, the thrust element 194 is a generally circular-shaped disc having an axial cylindrical bore formed therethrough. It is understood that the thrust element 194 can have various shapes and sizes as desired. As illustrated in FIG. 5, the thrust element 194 is disposed about the annular hub 140 of the first planetary gear system 112 and the idler shaft 150. As shown, the thrust element 194 may have at least one substantially planar face. It is understood, however, that the thrust element 194 may have at least one face including various patterns and configurations of channels formed therein and protuberances formed thereon. Various types of bearings can be employed for the thrust element 194 as desired.

Figure 6:
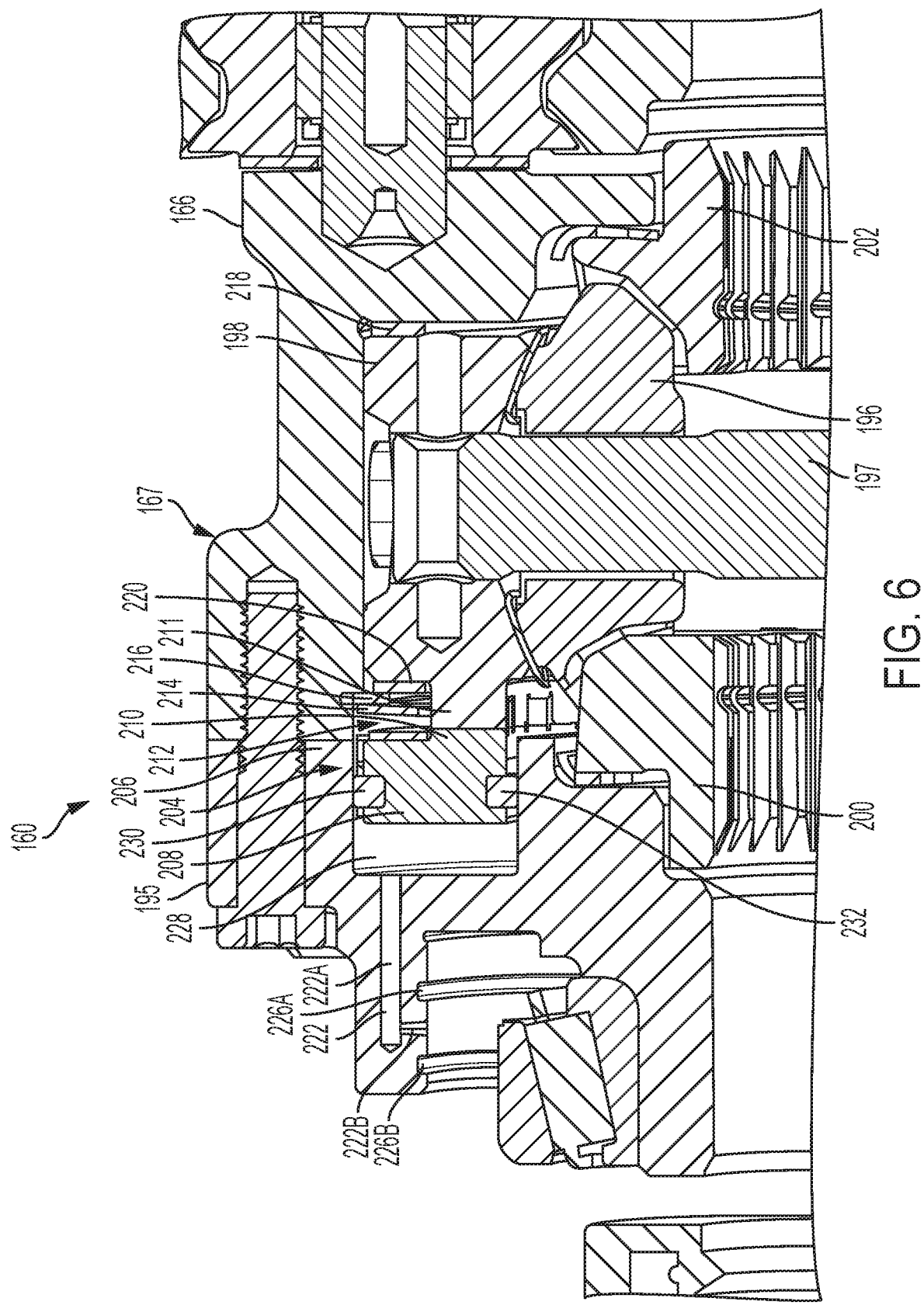
FIG. 6 is an enlarged sectional view of a portion of the differential of the electric drive axle shown in FIG. 4.

In certain embodiments shown in FIGS. 5-6, the differential case 167 further includes a second portion 195 coupled to the first portion 166. It should be appreciated that the portions 166 and 195 may be coupled by any method as desired such as by at least one fastener, a weld, an epoxy, and the like, for example. The differential 160 is rotatably supported within the axle housing (not shown). In certain embodiments, the motor output shaft 106, the planetary gear systems 112, 114, and the differential 160 are rotatably supported in an axle housing (not shown) via first and second bearings 162A, 162B. It is understood that each of the bearings 162A, 162B can be any type of bearing as desired such as a roller bearing, a ball bearing, a tapered bearing, and the like, for example.

The differential case 167 houses two or more differential pinions 196. The differential pinions 196 are coupled to each other via a pinion shaft 197. As shown, each end of the pinion shaft 197 is coupled to a pinion sleeve 198 disposed thereon. It is understood that the pinion sleeve 198 may be coupled to the pinion shaft 197 by any method as desired such as a pin (not shown), for example. The pinion sleeve 198 pilots within an interior of the differential case 167. The differential pinions 196 are in meshed engagement with first and second side gears 200, 202. The first and second side gears 200, 202 are coupled for rotation with the first and second half shafts 16, 18, respectively, shown in FIG. 1.

As more clearly illustrated in FIGS. 5-6, the differential 160 further includes a disconnect device 204. The disconnect device 204 includes an annular hub 206 integrally formed with the second portion 195 of the differential case 167. It is understood, however, that the annular hub 206 may be formed as a separate and distinct component if desired. At least one protuberance 207 (e.g. a tab or spline), shown in FIGS. 9-10, may be formed on an inner peripheral surface of the annular hub 206 extending radially inward therefrom.

The disconnect device 204 further includes a piston member 208 concentrically disposed within the annular hub 206 and the pinion sleeve 198. In certain embodiments, the piston member 208 may include at least one protuberance 209 (e.g. a tab or spline), shown in FIGS. 9-10, extending radially outward therefrom. The protuberance 209 of the piston member 208 cooperates with the protuberance 207 formed on the inner peripheral surface of the annular hub 206 to couple the piston member 208 to the differential case 167, thereby militating against a rotational movement of the piston member 208 relative to the differential case 167. As such, the piston member 208 receives torque from the electric motor 104 through the planetary gear system 112, 114 and the differential case 167. The piston member 208 may move axially relative to the differential case 167 within the annular hub 206. It is understood that the piston member 208 can be coupled to the differential case 167 militating against a rotational movement relative to the differential case 167, while permitting an axial movement relative to the differential case 167 within the annular hub 206, by any suitable method as desired.

The piston member 208 may further include a plurality of protuberances 210 (e.g. dog teeth), more clearly shown in FIGS. 5-10, extending axially outward from an inboard surface thereof. The protuberances 210 of the piston member 208 are configured to cooperate with a plurality of protuberances 211 (e.g. dog teeth), more clearly shown in FIGS. 5-8, extending axially outward from an outboard surface of the pinion sleeve 198. When the protuberances 210 of the piston member 208 are in meshed engagement with the protuberances 211 of the pinion sleeve 198 (shown in FIG. 6), the disconnect device 204 is in a first or engaged position.

Contrarily, when the protuberances 210 of the piston member 208 are spaced apart from the protuberances 211 of the pinion sleeve 198 (shown in FIG. 5), the disconnect device 204 is in an opposite second or disengaged position.

A spacer 212 may be disposed axially adjacent the piston member 208 within the annular hub 206. The spacer 212 is generally ring-shaped and concentrically disposed about the piston member 208. The spacer 212 performs as an abutment for a biasing member 214 disposed between the piston member 208 and the pinion sleeve 198. The biasing member 214 is configured to urge the piston member 208 in a first axial direction away from the pinion sleeve 198 during disengagement of the disconnect device 204. Various biasing members may be employed as the biasing member 214 such as a wave spring, a helical spring, and the like, for example. A positioning element 216 may be disposed axially adjacent the biasing member 214 opposite the piston member 208 to maintain an axial position of the biasing member 214 during operation of the disconnect device 204. In certain embodiments, a bushing 218 is disposed axially between the pinion sleeve 198 and the first portion 166 of the differential case 167. Similarly, a bushing 220 is disposed axially between the pinion sleeve 198 and the positioning element 216. The bushings 218, 220 are configured to militate against frictional contact between the pinion sleeve 198 and the first portion 166 of the differential case 167 and the positioning element 216. It should be appreciated that the positioning element 216 also performs as a reaction surface for the biasing member 214 to militate against an axially loading of the pinion sleeve 198 and the bushings 218, 220 by the biasing member 214.

Referring now to the embodiment shown in FIGS. 5-8 and 11, the second portion 195 of the differential case 167 may also include a fluid conduit 222 formed therein. The fluid conduit 222 is in fluid communication with a second fluid source (not depicted) and configured to receive a second fluid (not depicted) therethrough. Various types of second fluids from various second fluid sources can be used as desired such as a cooling fluid from the electric motor 104, a lubricating fluid from a gearbox of the electric drive axle 100, a hydraulic fluid from a hydraulic manifold, for example.

A fluid pump may be employed to facilitate a flow of the second fluid to the fluid conduit 222. In one non-limiting example, the fluid pump is an engine cooling fluid pump employed to cause both the flow of the second fluid to the differential case 167 and the cooling fluid to be dispersed onto end windings of the electric motor 104. Accordingly, the fluid pump may be selectively in fluid communication with a plurality of fluid circuits (not depicted) such as a fluid circuit configured to supply the second fluid to the differential case 167 and a fluid circuit configured to supply the cooling fluid to the electric motor 104, for example. At least one valve (e.g. a solenoid valve) may be used to control the flow of the fluids through each of the fluid circuits in fluid communication with the fluid pump.

In another non-limiting example, the fluid pump is a separate and distinct component from the engine cooling pump. As such, the fluid pump is in fluid communication with only the fluid circuit configured to supply the second fluid to the differential case 167. At least one valve may still be used to control the flow of the second fluid through the fluid circuit configured to supply the second fluid to the differential case 167. It is understood, however, that various types and sizes of fluid pumps disposed at various locations in the vehicle 10 may be employed if desired.

Figure 11:
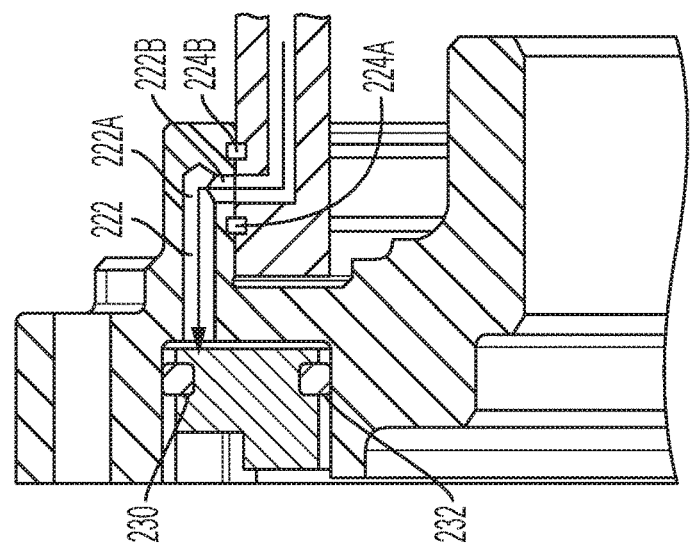
FIG. 11 is an enlarged sectional view of a portion of the differential of the electric drive axle shown in FIG. 4.
Figure 10:
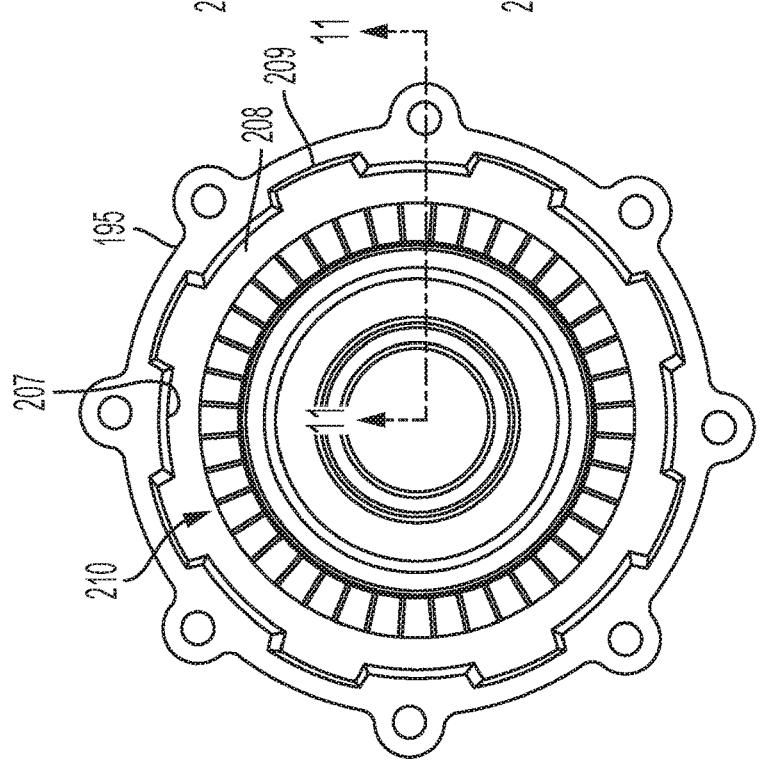
FIG. 10 is a front elevational view of the portion of the disconnect device shown in FIGS. 7-9.
Figure 9:
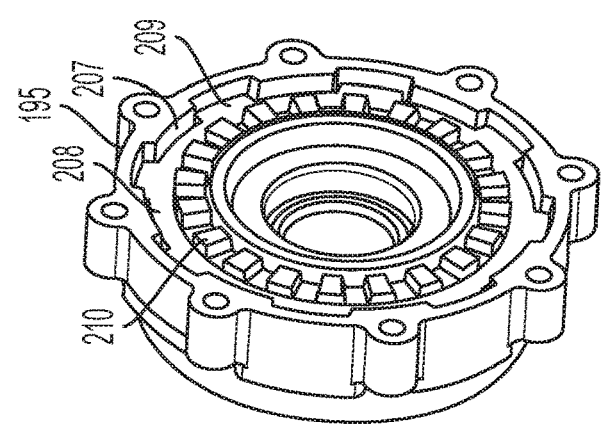
FIG. 9 is a perspective view of a portion of the disconnect device shown in FIGS. 7-8.

As shown, the fluid conduit 222 comprises a first flow path 222A and a second flow path 222B. The first flow path 222A is formed substantially parallel to the longitudinal axis X-X of the idler shaft 150 and the second flow path 222B is formed substantially perpendicular to the longitudinal axis X-X of the idler shaft 150. It should be appreciated that any number of flow paths 222A, 222B, may be formed in the second portion 195 of the differential case 167 if desired. A pair of sealing members 224A, 224B, shown in FIG. 11, are disposed about an inner peripheral surface of the second portion 195 of the differential case 167. The sealing members 224A, 224B are disposed in a respective pair of grooves 226A, 226B formed in the second portion 195 of the differential case 167 on opposite sides of the fluid conduit 222 to militate against leakage therefrom. It is understood that any number of sealing members 224A, 224B may be employed if desired.

As shown, the fluid conduit 222 extends axially inward from an end of the second portion 195 of the differential case 167 to a chamber 228 (shown in FIG. 6) formed between the piston member 208 and the second portion 195 of the differential case 167. In certain embodiments, an amount of the second fluid in the chamber 228 is varied to selectively position the piston member 208 for engagement and disengagement of the disconnect device 104. A first sealing member 230 is interposed between an outer peripheral surface of the piston member 208 and the inner peripheral surface of the annular hub 206 and a second sealing member 232 is interposed between an inner peripheral surface of the piston member 208 and the inner peripheral surface of the annular hub 206. The sealing members 230, 232 form a substantially fluid-tight seal between the piston member 208 and the annular hub 206 to militate against leakage of the second fluid from the chamber 228 during operation of the disconnect device 204. Various other method may be employed to form the substantially fluid-tight seal between the piston member 208 and the annular hub 206 if desired.

In operation, the electric motor 104 outputs torque to the differential 160 via the first and second planetary gear systems 112, 114. A default state of the disconnect device 204 is the disengaged position. As such, the piston member 208 is in the first position. Hence, the vehicle 10 is driven solely by the internal combustion engine 12.

When the operator desires the vehicle 10 to be at least partially driven by the electric drive axle 100, a controller (not shown) transmits a signal to the operating device (not shown) to permit the flow of the second fluid to the disconnect device 204. As such, the second fluid flows through the fluid conduit 222 into the chamber 228 to linearly move the piston member 208 in a second axial direction from the first position to the second position thereof. When the piston member 208 is in the second position, the protuberances 210, 211 are in meshed engagement and the disconnect device 204 is in the engaged position. When the disconnect device 204 is in the engaged position, the first and second planetary gear systems 112, 114 transfer torque from the electric motor 104 to the differential 160. More particularly, the electric motor 104 drives the first gear 108 of the first planetary gear system 112. Since the annulus 118 of the first planetary gear system 112 is stationary, the first gear 108 drives the carrier 117 of the first planetary gear system 112. As such, a torque from the electric motor 104 is transferred through the first gear 108 and the carrier 117 of the first planetary gear system 112 to the idler shaft 150. The idler shaft 150 drives the second gear 152 of the second planetary gear system 114 disposed thereon. Since the annulus 158 of the second planetary gear system 114 is stationary, the second gear 152 drives the carrier 157 of the second planetary gear system 114. As such, the torque from the electric motor 104 is further transferred through second gear 152 and the carrier 157 of the second planetary gear system 114 to the differential case 167 of the differential 160.

The differential 160 then transfers the torque to the first and second axle shafts 16, 18 via the meshed engagement of the pinion gears 196 and the side gears 200, 202. When the electric drive axle 100 is in a power generation mode, the torque transfer described above is reversed.

When the operator no longer desires the vehicle 10 to be at least partially driven by the electric drive axle 100, the controller transmits a signal to the operating device to permit the flow of the second fluid out of the disconnect device 204. As such, the second fluid flows through the fluid conduit 222 out from the chamber 228 to the second fluid source. Accordingly, the biasing member 214 causes the piston member 208 to linearly move in the first axial direction from the second position to the first position thereof. When the piston member 208 is in the first position, the protuberances 210, 211 are spaced apart from each other and the disconnect device 204 is in the disengaged position. When the disconnect device 204 is in the disengaged position, the first and second planetary gear systems 112, 114 do not transfer torque from the electric motor 104 to the first and second axle shafts 16, 18 via the differential 160.

FIGS. 12-16 illustrate an electric drive axle 300 according to another embodiment of the present invention similar to the electric drive axle 100 of FIGS. 1-11, except as described below. Structure repeated from the description of FIGS. 1-11 includes the same reference numeral. Variations of structure shown in FIGS. 1-11 include the same reference numeral and a prime (') symbol.

Embodiments of an electric drive axle 300 are described below. In certain embodiments, the electric drive axle 300 is utilized with a pure electric vehicle and/or an all-electric vehicle (not depicted) where the electric drive axle 300 is the only driving axle. In other embodiments, as illustrated in FIG. 1, the electric drive axle is utilized with a hybrid four-wheel-drive vehicle 10 where the front axle is driven by an internal combustion engine 12, and the rear axle is the electric drive axle 300 (or vice versa). In still other embodiments, the electric drive axle 300 is utilized in a hybrid commercial vehicle (not depicted) comprising a tandem axle in which the front tandem axle is driven by an internal combustion engine, and the rear tandem axle is the electric drive axle 300 (or vice versa). The electric drive axle 300 may have applications in commercial vehicles, both light duty and heavy duty vehicles, and for passenger, off-highway, and sport utility vehicles. Additionally, the electric drive axle 300 described herein may be adapted for use in front and/or rear driving axles, and in steerable and non-steerable axles. It would be understood by one of ordinary skill in the art that the electric drive axle 300 also has industrial, locomotive, military, agricultural, and aerospace applications.

In certain embodiments, the electric drive axle 300 may comprise an integrated drive system. In an embodiment, the electric drive axle 300 includes an electric motor (not depicted) (e.g., electromotor) coupled with a power source (not depicted). The electric motor may be a permanent magnet synchronous machine comprising a stator disposed concentrically about a rotor. The electric drive axle 300 may additionally comprise an inverter (not depicted) for converting direct current to alternating current when the electric motor is utilized to drive the vehicle, and for converting alternating current to direct current when the vehicle decelerates. The electric motor may be referred to herein as a motor-generator. Further, the electric drive axle 300 may include cooling fluid (not depicted) such as, but not limited to, automatic transmission fluid or axle oil integrated with the electric drive axle 300 lubricant for cooling the electric motor and the inverter. In another embodiment (not depicted), the cooling fluid for the electric motor and the inverter may not be integrated with the axle oil. The electric drive may have either a co-axial (as shown) or off axis layout where the axle shaft connecting the wheel to the differential does not pass through the center or the motor but rather parallel to the motor axis.

Figure 12:
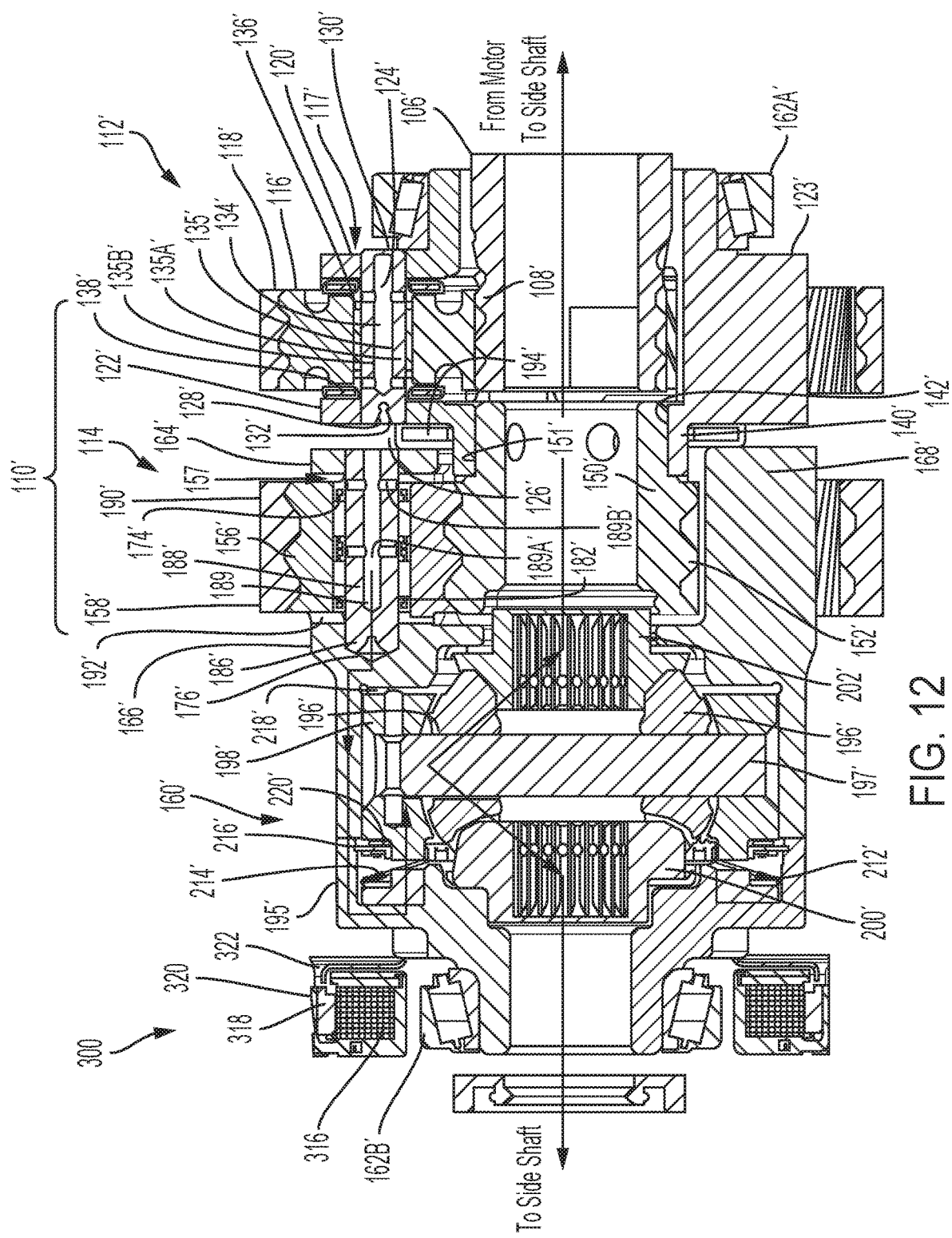
FIG. 12 is cross-sectional view of a portion of the electric drive axle shown in FIG. 1 according to another embodiment of the presently disclosed subject matter.
Figure 13:
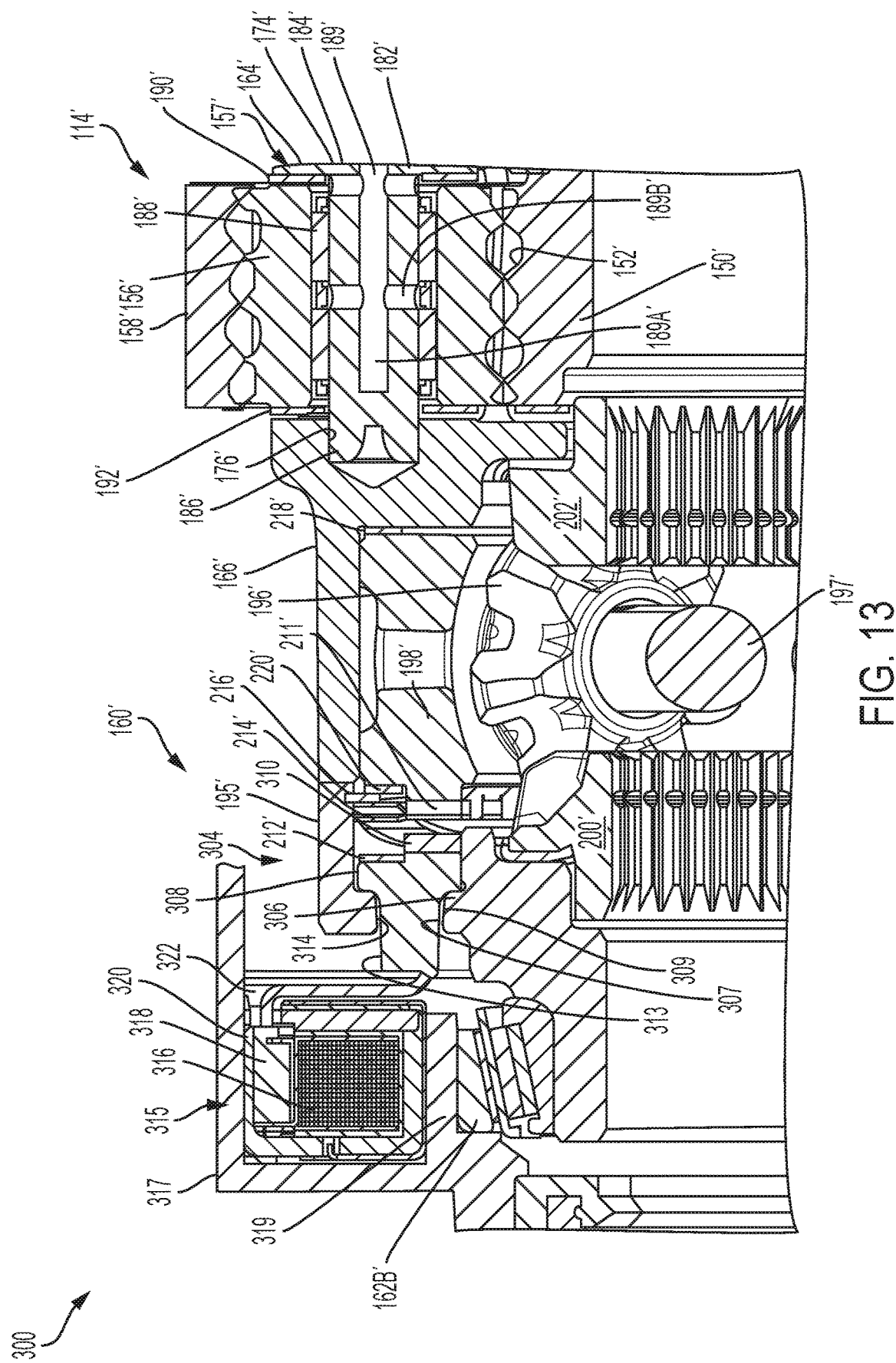
FIG. 13 is an enlarged sectional view of a portion of the differential of the electric drive axle shown in FIG. 12.

A motor output shaft 106' is coupled with the rotor of the electric motor for rotation therewith. A first gear 108' is coupled with the motor output shaft 106'. The electric motor drives a gear arrangement 110' via the motor output shaft 106' and the first gear 108'. In an embodiment, as illustrated in FIGS. 12-13, the gear arrangement 110' is disposed co-axial with the motor output shaft 106'. As illustrated in FIGS. 12 and 13, the gear arrangement 110' comprises a first planetary gear system 112' and a second planetary gear system 114'. The first planetary gear system 112' includes the first gear 108' (which operates as a sun gear), a plurality of planet gears 116' mounted on a carrier 117' and an annulus 118'. The first planetary gear system 112' is configured to produce a certain gear ratio.

In certain embodiments, the first planetary gear system 112' is configured to produce a reduction in the gear ratio between the electric motor and the second planetary gear system 114'. It is understood, however, that the reduction in the gear ratio of the first planetary gear system 112' depends upon which one of the planet gears 116', and the annulus 118' is operatively connected to the first gear 108', which one of the first gear 108', the planet gears 116', and the annulus 118' is stationary, and which one of the first gear 108', the planet gears 116', and the annulus 118' is operatively connected to the second planetary gear system 114'.

In the embodiments shown in FIGS. 12-13, the planet gears 116' are operatively connected to the second planetary system 114' via the carrier 117', and the annulus 118' is stationary and fixedly mounted on a housing (not depicted). For example, the annulus 118' may be fixedly mounted on the axle housing, if desired. In the embodiment shown, the first planetary gear system 112' includes three equally circumferentially spaced planet gears 116' mounted on the carrier 117'. It is understood, however, that the first planetary gear system 112' can include any number and size of planet gears 116' as desired. One of ordinary skill in the art should further understand that the planet gears 116' may be mounted at various other positions on the carrier 117'. As illustrated, each of the planet gears 116' is in meshed engagement with the first gear 108' and the annulus 118'. Various methods of meshed engagement between each of the planet gears 116', the first gear 108', and the annulus 118' can be employed as desired.

In certain embodiments, the carrier 117' includes a first end plate 120', a second end plate 122' spaced apart from the first end plate 120', and a web 123' formed therebetween. As more clearly shown in FIG. 12, each of the end plates 120', 122' includes a plurality of apertures 124', 126', respectively, formed therein. The apertures 124' formed in the first end plate 120' are aligned with the apertures 126' formed in the second end plate 122'. Additionally, the web 123' may be formed with recesses (not shown) at angularly spaced locations aligned with the apertures 124', 126' to allow at least a portion of the planet gears 116' to protrude therefrom. In the embodiment shown, the end plates 120', 122' each include three equally circumferentially spaced apertures 124', 126', respectively, formed therein. It is understood, however, that the end plates 120', 122' can include any number and size of apertures 124', 126' and the web 123' can include any number and size of recesses, as desired. One of ordinary skill in the art should further understand that the apertures 124', 126' may be formed at various other positions in the respective end plates 120', 122', and the recesses (not shown) may be formed at various other positions in the web 123.

The first planetary gear system 112' shown further includes a plurality of pinion shafts 128'. Each of the pinion shafts 128' is disposed axially through one of the planet gears 116' and supported at respective ends 130', 132' thereof by a pair of the apertures 124', 126' formed in the respective end plates 120', 122' of the carrier 117'. The pinion shafts 128' may be coupled to the carrier 117' by any device or method as desired such as being press fit into the apertures 124', 126' or secured by a pin, for example. A needle bearing 134', shown in FIG. 12, is radially disposed on an outer periphery of each of the pinion shafts 128'. Each of the planet gears 116' is rotatably supported on the outer periphery of each of the pinion shafts 128' by the needle bearing 134'. In certain embodiments, each of the pinion shafts 128' has a generally cylindrical shape. It is understood, however, that the pinion shafts 128' can have other shapes and sizes as desired.

As more clearly illustrated in FIG. 12, at least one of the pinion shafts 128' may include at least one fluid conduit 135' formed therein. In certain embodiments, each of the pinion shafts 128' includes at least one first fluid conduit 135A' formed to extend axially therethrough and at least one second fluid conduit 135B' formed to extend radially from the at least one first fluid conduit 135A' to an outer peripheral surface thereof. The fluid conduits 135A', 135B' permit a flow of a fluid (e.g. a lubricant) from a fluid source (not shown) to within the first planetary gear system 112' to provide lubrication thereto. It should be appreciated that any number, size, and shape of fluid conduit 135' may be formed in any of the pinion shafts 128' as desired.

In certain embodiments, the first planetary gear system 112' further includes a first thrust member 136' and a second thrust member 138'. The thrust members 136', 138' are configured to minimize friction and excessive wear between the planet gears 116' and the carrier 117'. In the certain embodiments, each of the thrust members 136', 138' is a generally circular-shaped disc having an axial cylindrical bore formed therethrough. It is understood that each of the thrust members 136', 138' can have various shapes and sizes as desired. As illustrated in FIG. 12, the first thrust member 136' is disposed about each of the pinion shafts 128' and interposed between the first end plate 120' of the carrier 117' and at least one of the planet gears 116'. Similarly, the second thrust member 138' is disposed about each of the pinion shafts 128' and interposed between the second end plate 122' of the carrier 117' and at least one of the planet gears 116'. As shown, each of the planet gears 116', the carrier 117', and the thrust members 136', 138' may have at least one substantially planar face. It is understood, however, that each of the planet gears 116', the carrier 117', and the thrust members 136', 138' may have at least one face including various patterns and configurations of channels formed therein and protuberances formed thereon.

As more clearly shown in FIG. 12, the carrier 117' further includes an annular hub 140' extending axially outwardly from an outer surface of the second end plate 122'. The annular hub 140' includes a plurality of splines 142' or a connector (not shown) formed on an inner peripheral surface thereof. Although the annular hub 140' shown is integrally formed on the carrier 117', it is understood that it can be coupled to the second end plate 122' as a separate and distinct component of the carrier 117', if desired. The annular hub 140' is disposed concentrically about an idler shaft 150. In certain embodiments, the idler shaft 150' includes a plurality of splines 151' formed on an outer peripheral surface thereof. As depicted, the first planetary gear system 112' is operatively connected to the second planetary gear system 114'. In certain embodiments, a splined connection is formed between planetary gear systems 112', 114' having the splines 142' of the annular hub 140 meshed with the splines 151' of the idler shaft 150'.

Now with regards to the second planetary gear system 114'. The second planetary gear system 114' includes a second gear 152' (which operates as a sun gear) coupled with the idler shaft 150', a plurality of planet gears 156' mounted on a carrier 157' and an annulus 158'. The second planetary gear system 114' is configured to produce a certain gear ratio. In certain embodiments, the second planetary gear system 114' is configured to produce a reduction in the gear ratio between the first planetary gear system 112' and a differential 160'. It is understood, however, that the reduction in the gear ratio of the second planetary gear system 114' depends upon which one of the second gear 152', the planet gears 156', and the annulus 158' is operatively connected to the first planetary gear system 112', which one of the second gear 152', the planet gears 156', and the annulus 158' is stationary, and which one of the second gear 152', the planet gears 156', and the annulus 158' is operatively connected to the differential 160'.

In the embodiments shown in FIGS. 12-13, the planet gears 156' are operatively connected to the differential 160' via the carrier 157', and the annulus 158' stationary and fixedly mounted on a housing 161'. For example, the annulus 158' may be fixedly mounted on the axle housing, if desired. In the embodiment shown, the second planetary gear system 114' includes three equally circumferentially spaced planet gears 156' mounted on the carrier 157'. It is understood, however, that the second planetary gear system 114' can include any number and size of planet gears 156' as desired. One of ordinary skill in the art should further understand that the planet gears 156' may be mounted at various other positions on the carrier 157'. As illustrated, each of the planet gears 156' is in meshed engagement with the second gear 152' and the annulus 158'. Various methods of meshed engagement between each of the planet gears 156', the second gear 152', and the annulus 158' can be employed as desired.

In certain embodiments, the carrier 157' includes a first end plate 164', a first portion 166' of a differential case 167' spaced apart from the first end plate 164', and a web 168', shown in FIG. 12, formed therebetween. Accordingly, the carrier 157' of the second planetary gear system 114' is integrally formed with the differential 160'. As illustrated in FIG. 12, each of the first end plate 164' and the first portion 166' of the differential case 167' includes a plurality of apertures 174', 176', respectively, formed therein. The apertures 174' formed in the first end plate 164' are aligned with the apertures 176' formed in the first portion 166' of the differential case 167'. Additionally, the web 168' may be formed with recesses (not shown) at angularly spaced locations aligned with the apertures 174', 176' to allow at least a portion of the planet gears 156' to protrude therefrom. In the embodiment shown, the first end plate 164' and the first portion 166' of the differential case 167' each includes three equally circumferentially spaced apertures 174', 176', respectively, formed therein. It is understood, however, that the first end plate 164 and the first portion 166' of the differential case 167' can include any number and size of apertures 174', 176' and the web 168' can include any number and size of recesses, as desired. One of ordinary skill in the art should further understand that the apertures 174', 176' may be formed at various other positions in the respective first end plate 164' and the first portion 166' of the differential case 167', and the recesses (not shown) may be formed at various other positions in the web 168'.

The second planetary gear system 114' shown further includes a plurality of pinion shafts 182'. Each of the pinion shafts 182' is disposed axially through one of the planet gears 156' and supported at respective ends 184', 186' thereof by a pair of the apertures 174', 176' formed in the respective first end plate 164' of the carrier 157' and the first portion 166' of the differential case 167'. The pinion shafts 182' may be coupled to the carrier 157' and the differential case 167' by any device or method as desired such as being press fit into the apertures 174', 176' or secured by a pin, for example. A pair of needle bearings 188', shown in FIG. 12, is radially disposed on an outer periphery of each of the pinion shafts 182'. Each of the planet gears 156' is rotatably supported on the outer periphery of each of the pinion shafts 182' by the needle bearings 188'. In certain embodiments, each of the pinion shafts 182' has a generally cylindrical shape. It is understood, however, that the pinion shafts 182' can have other shapes and sizes as desired.

As more clearly illustrated in FIG. 12, at least one of the pinion shafts 182' may include at least one fluid conduit 189' formed therein. In certain embodiments, each of the pinion shafts 182' includes at least one first fluid conduit 189A' formed to extend axially therethrough and at least one second fluid conduit 189B' formed to extend radially from the at least one first fluid conduit 189A' to an outer peripheral surface thereof. The fluid conduits 189A', 189B' permit a flow of a fluid (e.g. a lubricant) from a fluid source (not shown) to within the second planetary gear system 114' to provide lubrication thereto. It should be appreciated that any number, size, and shape of fluid conduit 189' may be formed in any of the pinion shafts 182' as desired.

In certain embodiments, the second planetary gear system 114' further includes a first thrust member 190' and a second thrust member 192'. The thrust members 190', 192' are configured to minimize friction and excessive wear between the planet gears 156', the first end plate 164' of the carrier 157', and the first portion 166' of the differential case 167'. In the certain embodiments, each of the thrust members 190', 192' is a generally circular-shaped disc having an axial cylindrical bore formed therethrough. It is understood that each of the thrust members 190', 192' can have various shapes and sizes as desired. As illustrated in FIG. 12, the first thrust member 190' is disposed about each of the pinion shafts 182' and interposed between the first end plate 165' of the carrier 157' and at least one of the planet gears 156'. Similarly, the second thrust member 192' is disposed about each of the pinion shafts 182' and interposed between the portion 166' of the differential 160' and at least one of the planet gears 156'. As shown, each of the planet gears 156', the first end plate 164' of the carrier 157', the first portion 166' of the differential case 167', and the thrust members 190', 192' may have at least one substantially planar face. It is understood, however, that each of the planet gears 156', the first end plate 164' of the carrier 157', the first portion 166' of the differential case 167', and the thrust members 190', 192' may have at least one face including various patterns and configurations of channels formed therein and protuberances formed thereon.

A thrust element 194' is disposed between the first planetary gear system 112' and the second planetary gear system 114'. The thrust element 194' is configured to minimize friction and excessive wear between the second thrust member 122' of the carrier 117' and the first end plate 164' of the carrier 157'. In the certain embodiments, the thrust element 194' is a generally circular-shaped disc having an axial cylindrical bore formed therethrough. It is understood that the thrust element 194' can have various shapes and sizes as desired. As illustrated in FIG. 12, the thrust element 194' is disposed about the annular hub 140' of the first planetary gear system 112' and the idler shaft 150'. As shown, the thrust element 194' may have at least one substantially planar face. It is understood, however, that the thrust element 194' may have at least one face including various patterns and configurations of channels formed therein and protuberances formed thereon. Various types of bearings can be employed for the thrust element 194' as desired.

In certain embodiments shown in FIGS. 12-13, the differential case 167' further includes a second portion 195' coupled to the first portion 166'. It should be appreciated that the portions 166' and 195' may be coupled by any method as desired such as by at least one fastener, a weld, an epoxy, and the like, for example. The differential 160' is rotatably supported within the axle housing (not shown). In certain embodiments, the motor output shaft 106', the planetary gear systems 112', 114', and the differential 160' are rotatably supported in an axle housing (not shown) via first and second bearings 162A', 162B'. It is understood that each of the bearings 162A', 162B' can be any type of bearing as desired such as a roller bearing, a ball bearing, a tapered bearing, and the like, for example.

The differential case 167' houses two or more differential pinions 196'. The differential pinions 196' are coupled to each other via a pinion shaft 197'. As shown, each end of the pinion shaft 197' is coupled to a pinion sleeve 198' disposed thereon. It is understood that the pinion sleeve 198' may be coupled to the pinion shaft 197' by any method as desired such as a pin (not shown), for example. The pinion sleeve 198' pilots within an interior of the differential case 167'. The differential pinions 196 are in meshed engagement with first and second side gears 200', 202'. The first and second side gears 200', 202' are coupled for rotation with the first and second half shafts 16, 18, respectively, shown in FIG. 1.

As more clearly illustrated in FIG. 13, the differential 160' further includes a disconnect device 304. The disconnect device 304 includes an annular hub 306 integrally formed with the second portion 195' of the differential case 167'. It is understood, however, that the annular hub 306 may be formed as a separate and distinct component if desired. At least one protuberance 307 (e.g. a tab or spline) may be formed on an inner peripheral surface of the annular hub 306 extending radially outward therefrom.

The disconnect device 304 further includes a piston member 308 concentrically disposed within the annular hub 306 and the pinion sleeve 198'. In certain embodiments, the piston member 308 may include at least one protuberance 309 (e.g. a tab or spline) extending radially outward therefrom. The protuberance 309 of the piston member 308 cooperates with the protuberance 307 formed on the inner peripheral surface of the annular hub 306 to couple the piston member 308 to the differential case 167' thereby militating against a rotational movement of the piston member 308 relative to the differential case 167'. As such, the piston member 308 receives torque from the electric motor 104' through the planetary gear system 112', 114' and the differential case 167'. The piston member 308 may move axially relative to the differential case 167' within the annular hub 306. It is understood that the piston member 308 can be coupled to the differential case 167' militating against a rotational movement relative to the differential case 167', while permitting an axial movement relative to the differential case 167' within the annular hub 306, by any suitable method as desired.

The piston member 308 may further include a plurality of protuberances 310 (e.g. dog teeth), extending axially outward from an inboard surface thereof. The protuberances 310 of the piston member 308 are configured to cooperate with a plurality of protuberances 211' (e.g. dog teeth), extending axially outward from an outboard surface of the pinion sleeve 198'. When the protuberances 310 of the piston member 308 are in meshed engagement with the protuberances 211' of the pinion sleeve 198', the disconnect device 304 is in a first or engaged position. Contrarily, when the protuberances 310 of the piston member 308 are spaced apart from the protuberances 211' of the pinion sleeve 198', the disconnect device 304 is in an opposite second or disengaged position.

In the embodiment shown in FIGS. 12-16, the piston member 308 further includes a plurality of protuberances 313 (e.g. a tab or lug), extending axially outward from an outboard surface thereof. Each of the protuberances 313 shown extends through a respective aperture 314 formed in the second portion 195' of the differential case 167'. It should be appreciated that any number, size, and shape of protuberances 313 may be employed as desired. In certain embodiments shown in FIGS. 14 and 16, each of the protuberances 313 is spaced apart and circumferentially formed about the outboard surface of the piston member 308. In certain embodiments, the protuberances 313 militate against a rotational movement of the piston member 308 relative to the differential case 167', while permitting an axial movement relative to the differential case 167' within the annular hub 306. The at least one protuberance 313 is configured to cooperate with an actuator assembly 315 discussed herein intra.

A spacer 212' may be disposed axially adjacent the piston member 308 within the annular hub 306. The spacer 212' is generally ring-shaped and concentrically disposed about the piston member 308. The spacer 212' performs as an abutment for a biasing member 214' disposed between the piston member 308 and the pinion sleeve 198'. The biasing member 214' is configured to urge the piston member 308 in a first axial direction away from the pinion sleeve 198' during disengagement of the disconnect device 304. Various biasing members may be employed as the biasing member 214' such as a wave spring, a helical spring, and the like, for example. A positioning element 216' may be disposed axially adjacent the biasing member 214' opposite the piston member 308 to maintain an axial position of the biasing member 214' during operation of the disconnect device 304. In certain embodiments, a bushing 218' is disposed axially between the pinion sleeve 198' and the first portion 166' of the differential case 167'. Similarly, a bushing 220' is disposed axially between the pinion sleeve 198' and the positioning element 216'. The bushings 218', 220' are configured to militate against frictional contact between the pinion sleeve 198' and the first portion 166' of the differential case 167' and the positioning element 216'. It should be appreciated that the positioning element 216' also performs as a reaction surface for the biasing member 214' to militate against an axially loading of the pinion sleeve 198' and the bushings 218', 220' by the biasing member 214'.

Referring now to the embodiment shown in FIGS. 12-16, the actuator assembly 315 disposed in a housing 317 (e.g. a gear box housing). As illustrated, the actuator assembly 315 is concentrically disposed about the bearing 162B'. In one embodiment shown in FIG. 13, a portion 319 of the housing 317 is interposed between the actuator assembly 315 and the bearing 162B'. The actuator assembly 315 includes an actuator 316 and a movable member 318 disposed in a housing 320. The movable member 318 is configured to be axially translatable within the housing 320. In one embodiment, the actuator 316 may be an electromagnetic coil disposed in the housing 320. The actuator assembly 315 may be configured in such a manner that when electrical current is supplied to the electromagnetic coil, the movable member 318 is caused to travel in a second axial direction towards the piston member 308. It should be appreciated that at least a portion of the movable member 318 may be formed from a ferromagnetic material such as an iron material, for example. The actuator assembly 315 further includes a pressure plate 322 disposed between the moveable member 318 and the piston member 308. As illustrated, the movable member 318 is configured to abut and urge the pressure plate 322 in the second axial direction. The pressure plate 322 is configured to abut the protuberances 313 extending outwardly from the piston member 308 through the second portion 195 of the differential case 167 and urge the piston member 308 in the second axial direction towards the pinion sleeve 198', causing the disconnect device 304 to be engaged.

In certain other embodiments not shown, the actuator 316 of the actuator assembly 315 may be a cam mechanism (not shown) disposed in the housing 320. The cam mechanism is configured to abut the protuberances 313 extending outwardly from the piston member 308 through the second portion 195' of the differential case 167' and urge the piston member 308 in the second axial direction, causing the disconnect device 304 to be engaged. It should be appreciated that various other actuators 316 may be employed in the actuator assembly 315 as desired to abut the protuberances 313 extending outwardly from the piston member 308 through the second portion 195' of the differential case 167' and urge the piston member 308 in the second axial direction, causing the disconnect device 304 to be engaged.

In operation, the electric motor 104' outputs torque to the differential 160' via the first and second planetary gear systems 112', 114'. A default state of the disconnect device 304 is the disengaged position. As such, the piston member 308 is in the first position. Hence, the vehicle 10 is driven solely by the internal combustion engine 12.

When the operator desires the vehicle 10 to be at least partially driven by the electric drive axle 100', a controller (not shown) transmits a signal to the actuator assembly 315. The actuator assembly 315 causes the piston member 308 to linearly move in the second axial direction from the first position to the second position thereof. When the piston member 308 is in the second position, the protuberances 310, 211' are in meshed engagement and the disconnect device 304 is in the engaged position. When the disconnect device 304 is in the engaged position, the first and second planetary gear systems 112', 114' transfer torque from the electric motor 104' to the differential 160'. More particularly, the electric motor 104' drives the first gear 108' of the first planetary gear system 112'. Since the annulus 118' of the first planetary gear system 112' is stationary, the first gear 108' drives the carrier 117' of the first planetary gear system 112'.

As such, a torque from the electric motor 104' is transferred through the first gear 108' and the carrier 117' of the first planetary gear system 112' to the idler shaft 150'. The idler shaft 150' drives the second gear 152' of the second planetary gear system 114' disposed thereon. Since the annulus 158' of the second planetary gear system 114' is stationary, the second gear 152' drives the carrier 157' of the second planetary gear system 114'. As such, the torque from the electric motor 104' is further transferred through second gear 152' and the carrier 157' of the second planetary gear system 114' to the differential case 167' of the differential 160'.

The differential 160' then transfers the torque to the first and second axle shafts 16', 18' via the meshed engagement of the pinion gears 196' and the side gears 200', 202'. When the electric drive axle 300 is in a power generation mode, the torque transfer described above is reversed.

When the operator no longer desires the vehicle 10 to be at least partially driven by the electric drive axle 100', the controller transmits a signal to the actuator assembly 315. The actuator assembly 315 causes the piston member 308 to linearly move in the first axial direction from the second position to the first position thereof. When the piston member 308 is in the first position, the protuberances 310, 211' are spaced apart from each other and the disconnect device 304 is in the disengaged position. When the disconnect device 304 is in the disengaged position, the first and second planetary gear systems 112', 114' do not transfer torque from the electric motor 104' to the first and second axle shafts 16', 18' via the differential 160'.

Yet another embodiment of an electric drive axle 400 according to the present subject matter is disclosed and illustrated in FIGS. 17-34. The electric drive axle 400 shown has an off axis layout where the axle shaft connecting the wheel to the differential does not pass through the center or the motor but rather parallel to the motor axis.

Figure 17:
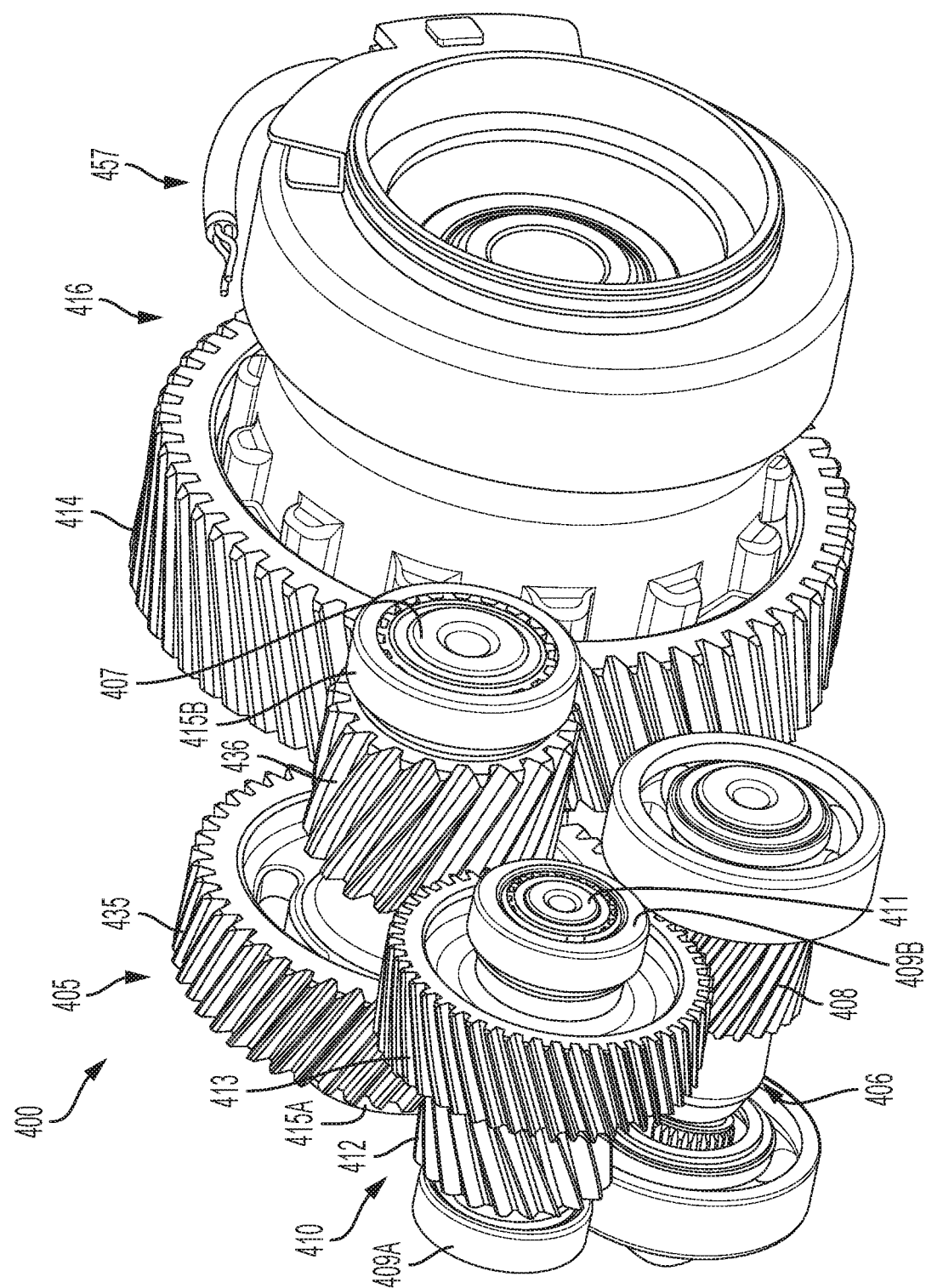
FIG. 17 is a perspective view of a portion of the electric drive axle according to another embodiment of the presently disclosed subject matter, wherein an electric motor and housing is not shown.
Figure 19:
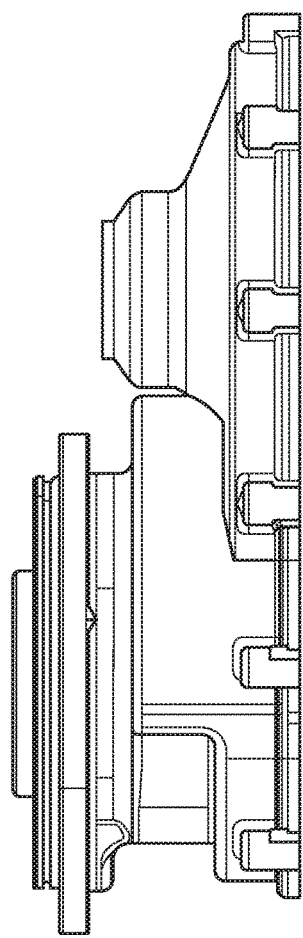
FIG. 19 is a top plan view of a first housing portion of the electric drive axle shown in FIG. 18.
Figure 20:
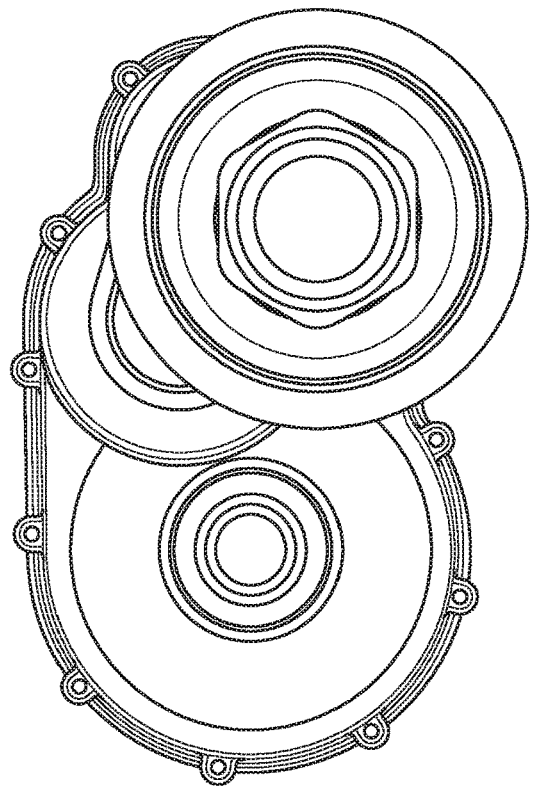
FIG. 20 is a front elevational view of the first housing portion of the electric drive axle shown in FIG. 19.
Figure 18:
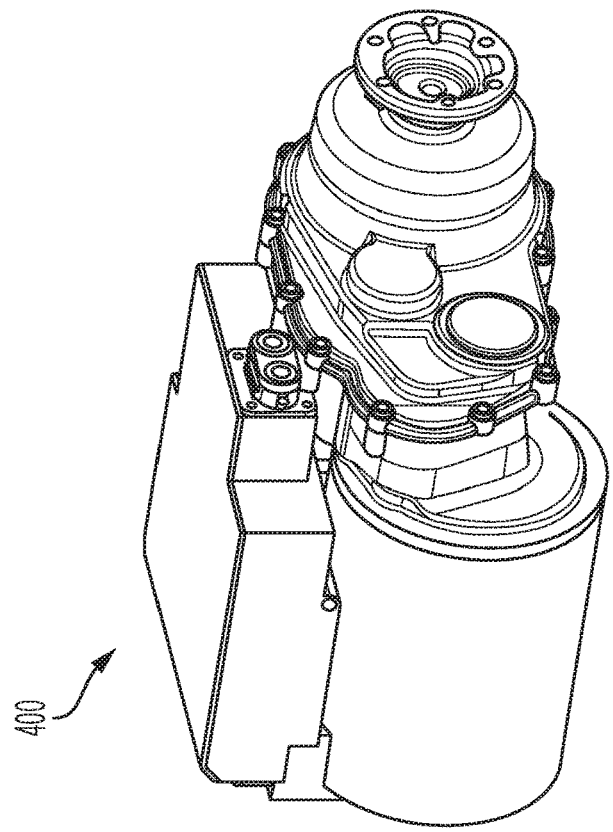
FIG. 18 is a perspective view of the portion of the electric drive axle shown in FIG. 17.
Figure 21:
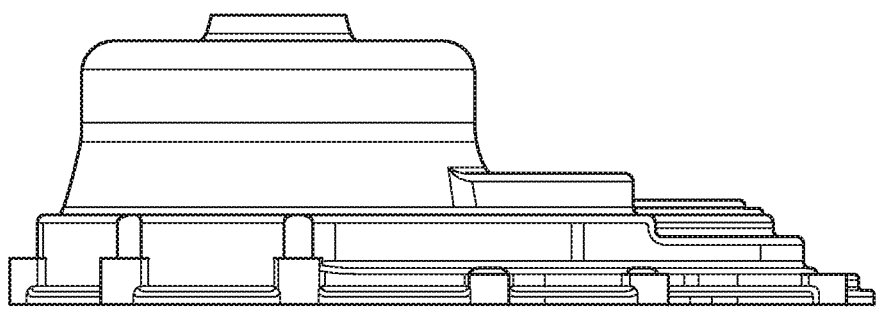
FIG. 21 is a top plan view of a second housing portion of the electric drive axle shown in FIG. 18.
Figure 22:
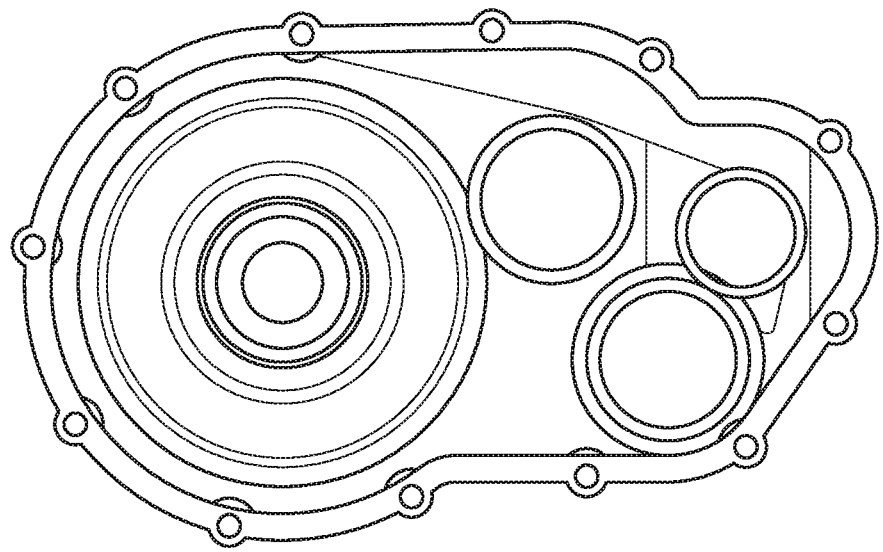
FIG. 22 is a front elevational view of the second housing portion of the electric drive axle shown in FIG. 21.
Figure 24:
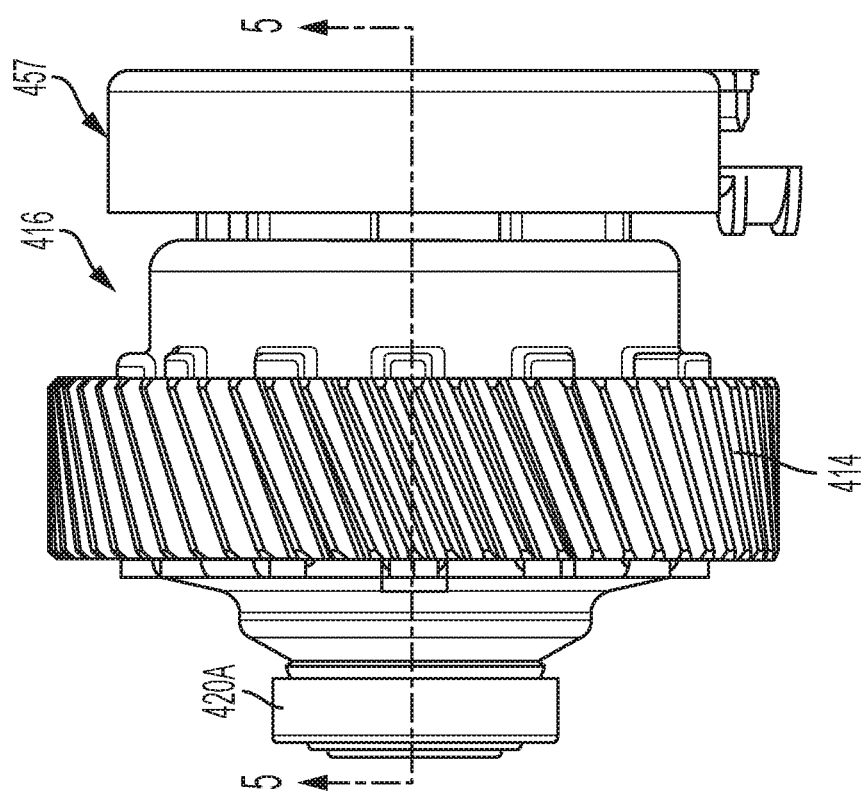
FIG. 24 is a side elevational view of the differential shown in FIG. 23.
Figure 23:
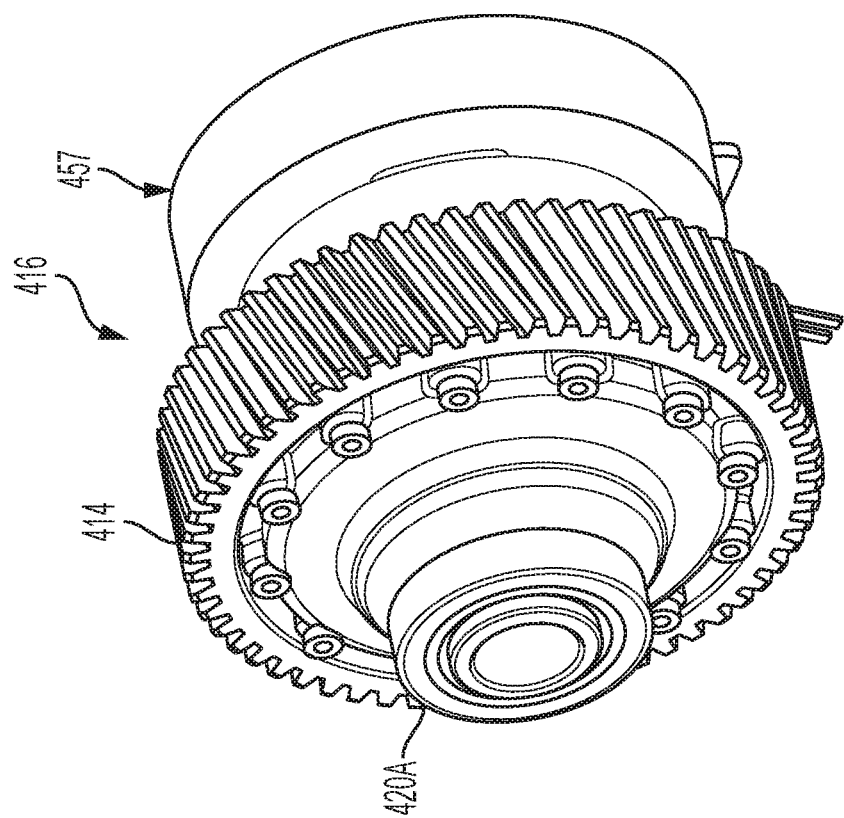
FIG. 23 is a perspective view of a differential of the electric drive axle shown in FIG. 17.

A motor output shaft 406 is coupled with the rotor of the electric motor 404 for rotation therewith. A first gear 408 is coupled with the motor output shaft 406. In certain embodiments, the electric motor 404 drives a first compound idler assembly 410 via the first gear 408. As illustrated in FIG. 17, the first compound idler assembly 410 is disposed parallel with the output shaft 406 of the electric motor 404. The first compound idler assembly 410 comprises an idler shaft 411 rotatably supported in the housing via first and second bearings 409A, 409B. It is understood that each of the bearings 409A, 409B can be any type of bearing as desired such as a roller bearing, a ball bearing, a tapered bearing, and the like, for example.

A second gear 412 and a third gear 413 are coupled for rotation with the idler shaft 411. The second gear 412 is disposed axially adjacent to the first bearing 409A. The third gear 413 is disposed axially adjacent to the second bearing 409B. The third gear 413 is in meshed engagement with the first gear 408 and receives torque therefrom when the electric motor 404 drives the electric drive axle 400. A pair of positioning elements (not depicted) may be respectively disposed on ends of the idler shaft 411 to maintain a position of the bearings 409A, 409B and the second and third gears 412, 413. It is understood that each of the positioning elements can be any type of positioning element as desired such as a snap ring, for example but could use a shim and press fit bearings if the application allows for it.

In certain embodiments, the first compound idler assembly 410 drives a second compound idler assembly 405 via the second gear 412. As illustrated in FIG. 17, the second compound idler assembly 405 is disposed parallel with both the output shaft 406 of the electric motor 404 and the idler shaft 411 of the first compound assembly 410. The second compound idler assembly 405 comprises an idler shaft 407 rotatably supported in the housing via a first bearing 415A and a second bearings 415B. It is understood that each of the bearings 415A, 415B can be any type of bearing as desired such as a roller bearing, a ball bearing, a tapered bearing, and the like, for example.

A fourth gear 435 and a fifth gear 436 are coupled for rotation with the idler shaft 407. The fourth gear 435 is disposed axially adjacent to the first bearing 415A. The fourth gear 435 is in meshed engagement with the second gear 412 and receives torque therefrom when the electric motor 404 drives the electric drive axle 400. The fifth gear 436 is disposed axially adjacent to the second bearing 415B. As illustrated, the fifth gear 436 is spaced apart from the third gear 413. In certain embodiments, the fifth gear 436 is spaced apart from the third gear 413 by at least 0.5 mm. A pair of positioning elements (not depicted) may be respectively disposed on ends of the idler shaft 407 to maintain a position of the bearings 415A, 415B and the fourth and fifth gears 435, 436. It is understood that each of the positioning elements can be any type of positioning element as desired such as a snap ring, for example but could use a shim and press fit bearings if the application allows for it.

The fifth gear 436 receives torque from the fourth gear 435, when the electric motor 404 drives the electric drive axle 400. As illustrated, the fifth gear 436 is in meshed engagement with a sixth gear 414. The sixth gear 414 is coupled for rotation with a differential 416. In certain embodiments shown in FIG. 25, the differential 416 includes a differential case 417 having a first portion 418 and a second portion 419. It should be appreciated that the portions 418, 419 may be coupled by any method as desired such as by at least one fastener, a weld, an epoxy, and the like, for example. The differential 417 is rotatably supported within the axle housing (not shown). In certain embodiments, the differential 417 is rotatably supported in an axle housing (not shown) via first and second bearings 420A, 420B. It is understood that each of the bearings 420A, 420B can be any type of bearing as desired such as a roller bearing, a ball bearing, a tapered bearing, and the like, for example.

The differential case 417 houses two or more differential pinions 426. The differential pinions 426 are coupled to each other via a pinion shaft 427. As shown, each end of the pinion shaft 427 is coupled to a pinion sleeve 428 disposed thereon. It is understood that the pinion sleeve 428 may be coupled to the pinion shaft 427 by any method as desired such as a pin (not shown), for example. The pinion sleeve 428 pilots within an interior of the differential case 417. The differential pinions 426 are in meshed engagement with first and second side gears 430, 432. The first and second side gears 430, 432 are coupled for rotation with the first and second half shafts 16, 18, respectively, shown in FIG. 1.

Figure 25:
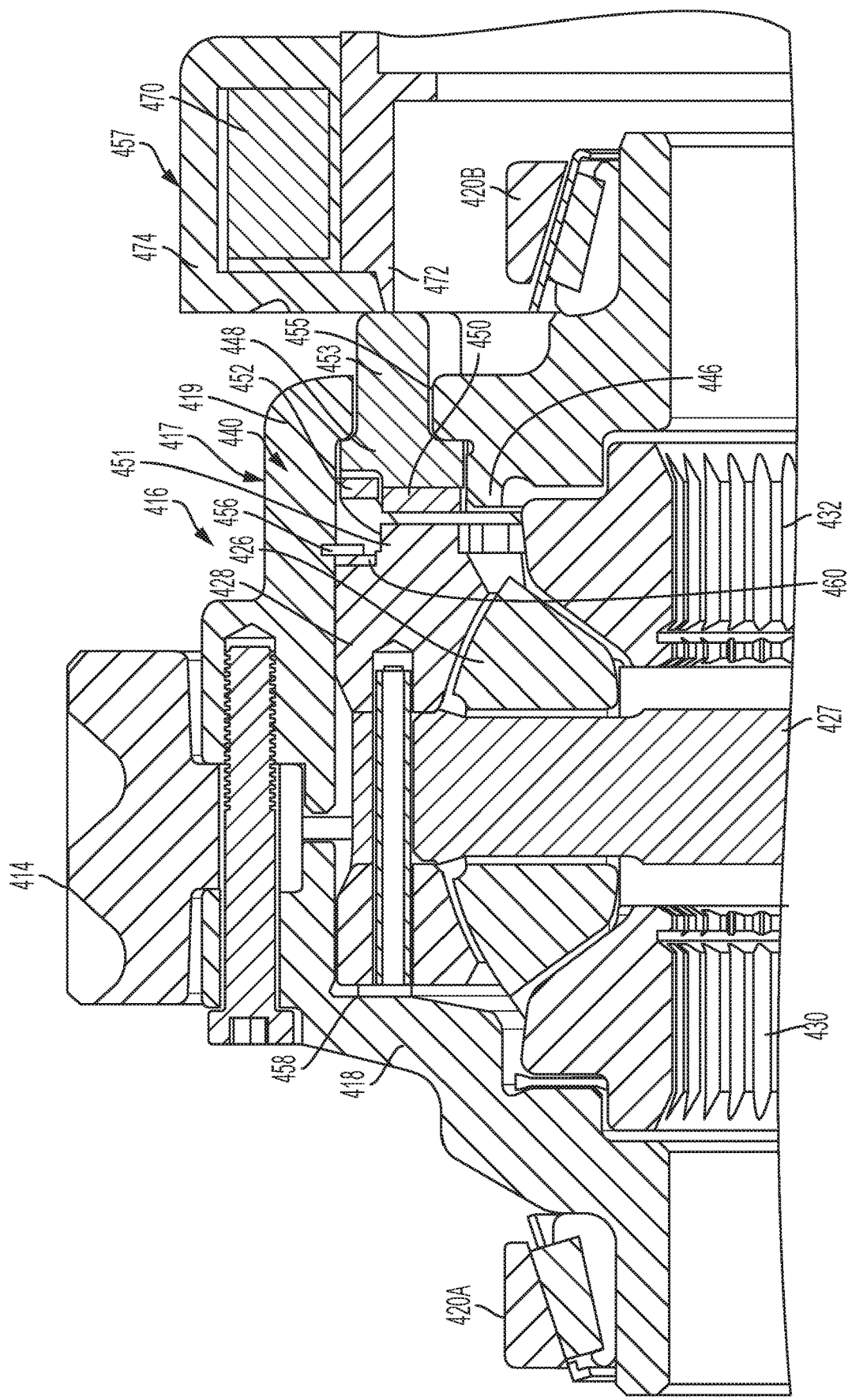
FIG. 25 is an enlarged sectional view of a portion of the differential shown in FIG. 24 taken along line A-A.
Figure 27:
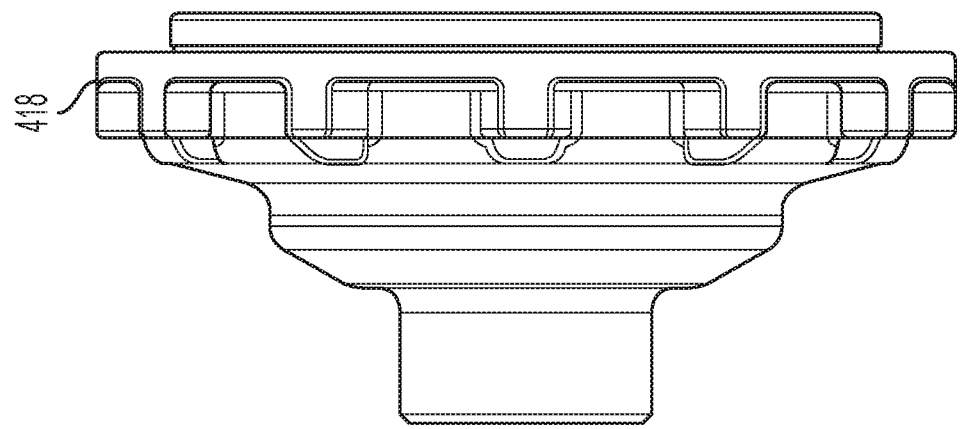
FIG. 27 is a side elevational view of the portion of the differential case shown in FIG. 26.
Figure 26:
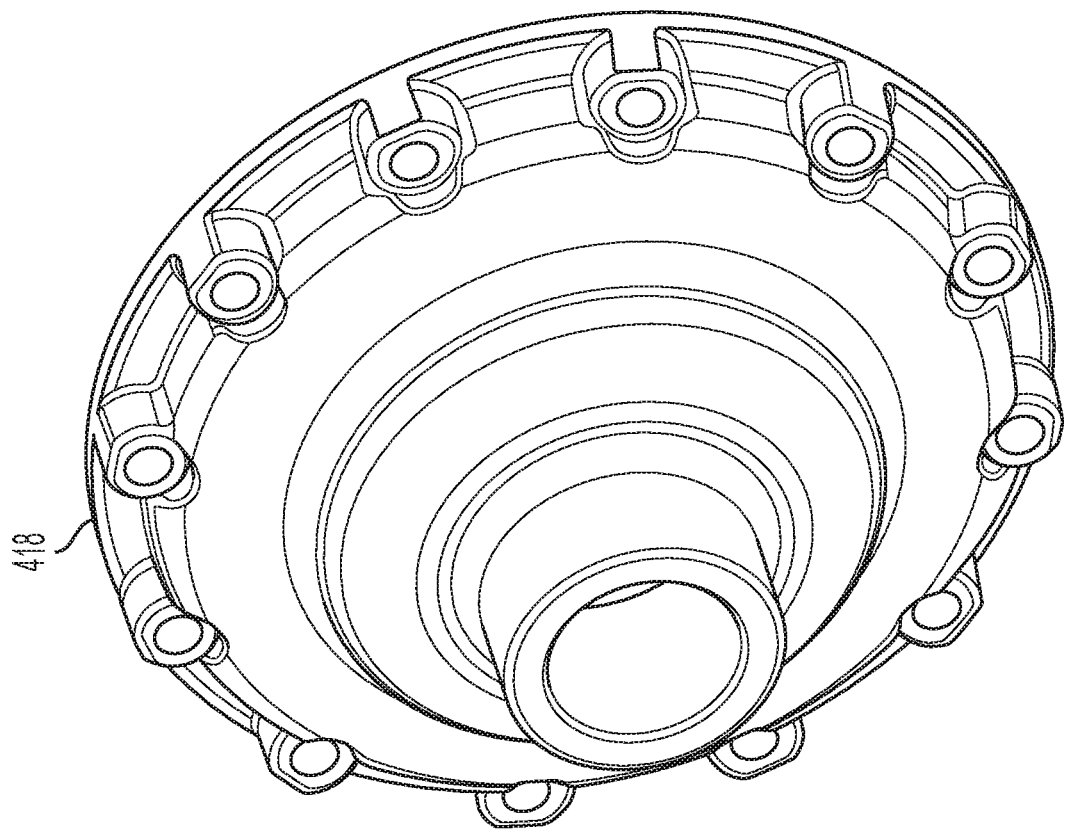
FIG. 26 is a perspective view of a first portion of a differential case of the differential shown in FIGS. 23-25.
Figure 29:
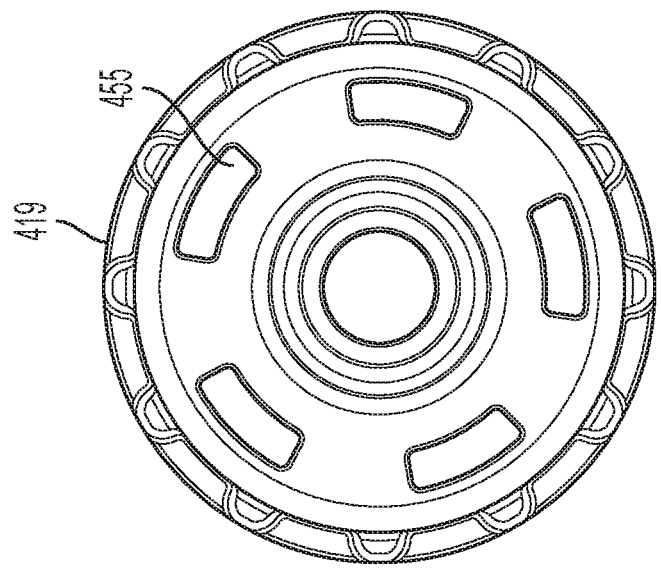
FIG. 29 is a front elevational view of the second portion of the differential case of the differential shown in FIG. 28.
Figure 28:
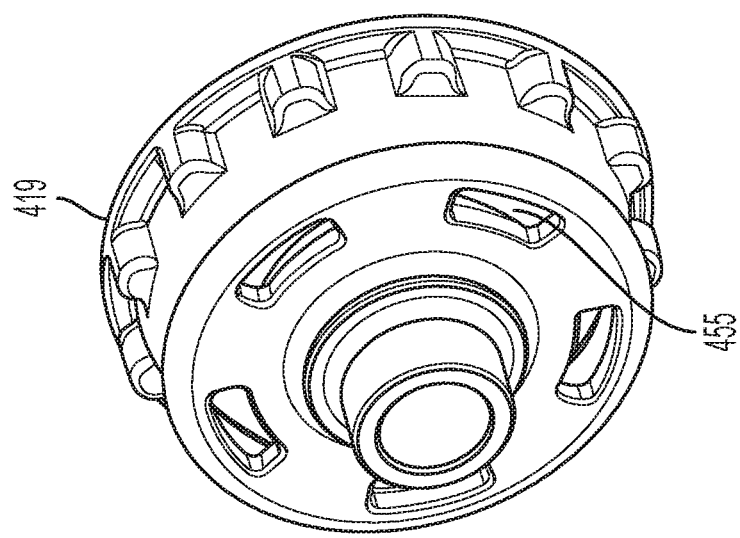
FIG. 28 is a perspective view of a second portion of the differential case of the differential shown in FIGS. 23-25.
Figure 32:
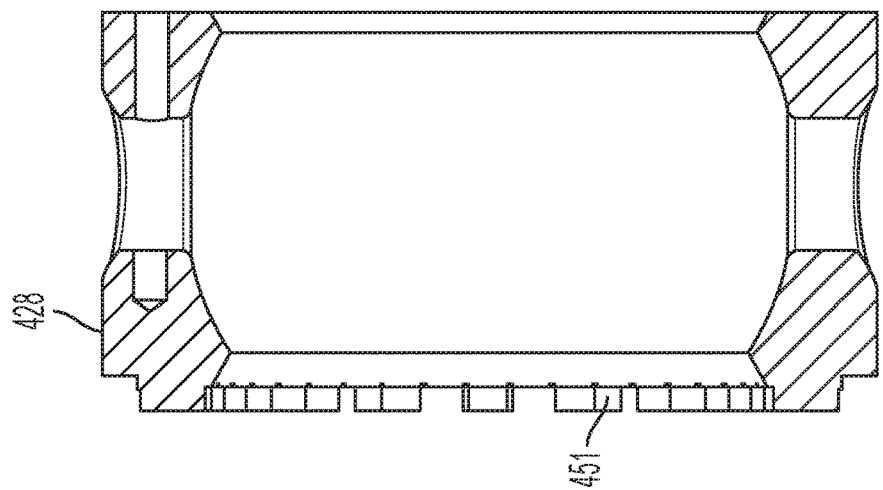
FIG. 32 is a cross-sectional view of the pinion sleeve shown in FIGS. 30-31.
Figure 31:
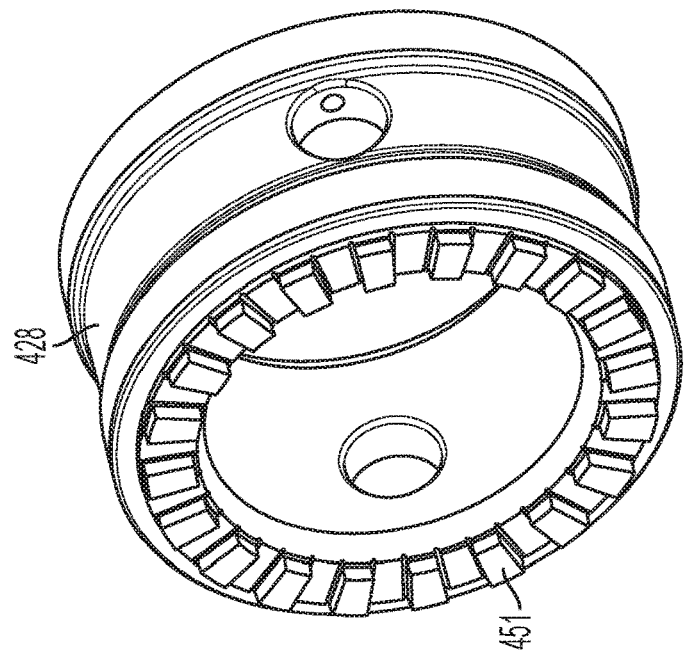
FIG. 31 is a perspective view of the pinion sleeve shown in FIG. 30.
Figure 30:
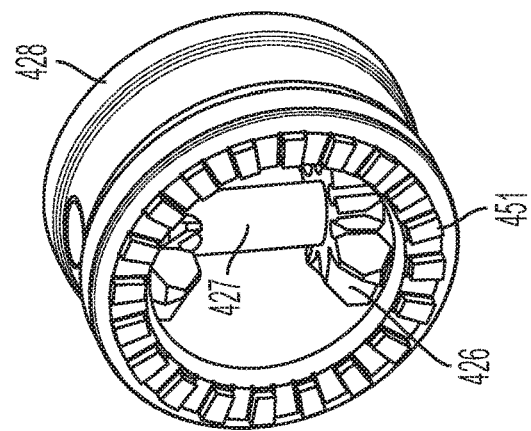
FIG. 30 is a perspective view of the differential shown in FIGS. 23-25, showing only a pinion sleeve, a pinion shaft, and pinion gears.
Figure 34:
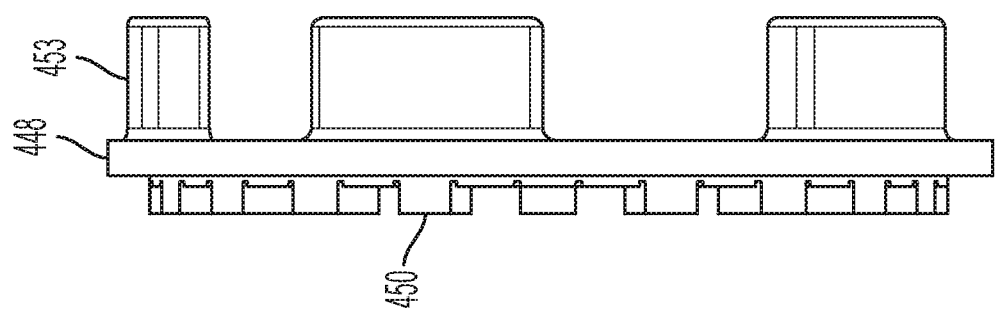
FIG. 34 is a side elevational view of the piston member shown in FIG. 33.
Figure 33:
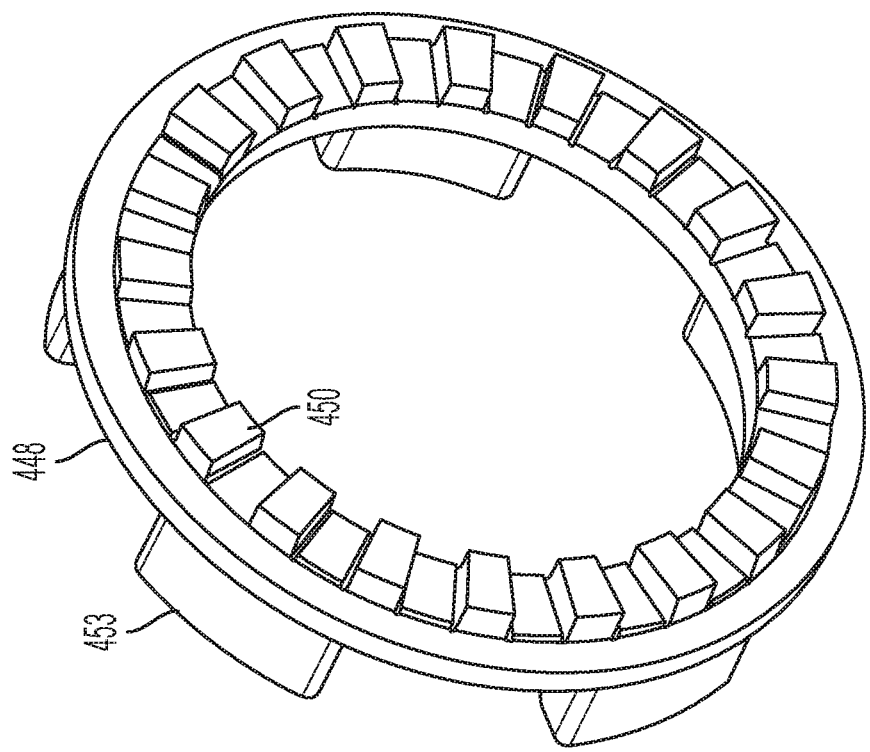
FIG. 33 is a perspective view of a piston member of the differential shown in FIGS. 23-25.

As more clearly illustrated in FIG. 25, the differential 416 further includes a disconnect device 440. The disconnect device 440 includes an annular hub 446 integrally formed with the second portion 419 of the differential case 417. It is understood, however, that the annular hub 446 may be formed as a separate and distinct component if desired. At least one protuberance (e.g. a tab or spline), not depicted, may be formed on an inner peripheral surface of the annular hub 446 extending radially inward therefrom.

The disconnect device 440 further includes a piston member 448 concentrically disposed within the annular hub 446 and the pinion sleeve 428. In certain embodiments, the piston member 448 may include at least one protuberance (e.g. a tab or spline), not depicted, extending radially outward therefrom. The protuberance of the piston member 448 cooperates with the protuberance formed on the inner peripheral surface of the annular hub 446 to couple the piston member 448 to the differential case 417, thereby militating against a rotational movement of the piston member 448 relative to the differential case 417. As such, the piston member 448 receives torque from the electric motor 404 through the at least one compound idler assembly 410 and the differential case 417. The piston member 448 may move axially relative to the differential case 417 within the annular hub 446. It is understood that the piston member 448 can be coupled to the differential case 417 militating against a rotational movement relative to the differential case 417, while permitting an axial movement relative to the differential case 417 within the annular hub 446, by any suitable method as desired.

The piston member 448 may further include a plurality of protuberances 450 (e.g. dog teeth), extending axially outward from an inboard surface thereof. The protuberances 450 of the piston member 448 are configured to cooperate with a plurality of protuberances 451 (e.g. dog teeth), extending axially outward from an outboard surface of the pinion sleeve 428. When the protuberances 450 of the piston member 448 are in meshed engagement with the protuberances 451 of the pinion sleeve 428, the disconnect device 440 is in a first or engaged position. Contrarily, when the protuberances 450 of the piston member 448 are spaced apart from the protuberances 451 of the pinion sleeve 428 (shown in FIG. 25), the disconnect device 440 is in an opposite second or disengaged position.

In the embodiment shown in FIGS. 17-34, the piston member 448 further includes a plurality of protuberances 453 (e.g. a tab or lug), extending axially outward from an outboard surface thereof. Each of the protuberances 453 shown extends through a respective aperture 455 formed in the second portion 419 of the differential case 417. It should be appreciated that any number, size, and shape of protuberances 453 may be employed as desired. In certain embodiments, each of the protuberances 453 is spaced apart and circumferentially formed about the outboard surface of the piston member 448. In certain embodiments, the protuberances 453 militate against a rotational movement of the piston member 448 relative to the differential case 417, while permitting an axial movement relative to the differential case 417 within the annular hub 446. The at least one protuberance 453 is configured to cooperate with an actuator assembly 457 discussed herein intra.

A spacer 452 may be disposed axially adjacent the piston member 448 within the annular hub 446. The spacer 452 is generally ring-shaped and concentrically disposed about the piston member 448. The spacer 452 performs as an abutment for a biasing member (not depicted) disposed between the piston member 448 and the pinion sleeve 428. The biasing member is configured to urge the piston member 448 in a first axial direction away from the pinion sleeve 428 during disengagement of the disconnect device 440. Various biasing members may be employed as the biasing member such as a wave spring, a helical spring, and the like, for example. A positioning element 456 may be disposed axially adjacent the biasing member opposite the piston member 448 to maintain an axial position of the biasing member during operation of the disconnect device 440. In certain embodiments, a bushing 458 is disposed axially between the pinion sleeve 428 and the first portion 418 of the differential case 417. Similarly, a bushing 460 is disposed axially between the pinion sleeve 428 and the positioning element 456. The bushings 458, 460 are configured to militate against frictional contact between the pinion sleeve 428 and the first portion 418 of the differential case 417 and the positioning element 456. It should be appreciated that the positioning element 456 also performs as a reaction surface for the biasing member to militate against an axially loading of the pinion sleeve 428 and the bushings 458, 460 by the biasing member.

Referring now to FIG. 25, the actuator assembly 457 is disposed in a housing (e.g. an axle housing). As illustrated, the actuator assembly 457 is concentrically disposed about the bearing 4208. In one embodiment shown, a portion of the housing is interposed between the actuator assembly 457 and the bearing 4208. The actuator assembly 457 includes an actuator 470 and a movable member 472 disposed in a housing 474. The movable member 472 is configured to be axially translatable within the housing 474. In one embodiment, the actuator 470 may be an electromagnetic coil disposed in the housing 474. The actuator assembly 457 may be configured in such a manner that when electrical current is supplied to the electromagnetic coil, the movable member 472 is caused to travel in a second axial direction towards the piston member 448. It should be appreciated that at least a portion of the movable member 472 may be formed from a ferromagnetic material such as an iron material, for example. The actuator assembly 457 may further include a pressure plate (not depicted) disposed between the moveable member 472 and the piston member 448. The movable member 472 is configured to abut and urge the pressure plate in the second axial direction. One of the moveable member 472 and the pressure plate is configured to abut the protuberances 453 extending outwardly from the piston member 448 through the second portion 419 of the differential case 417 and urge the piston member 448 in the second axial direction towards the pinion sleeve 428, causing the disconnect device 440 to be engaged.

In certain other embodiments not shown, the actuator 470 of the actuator assembly 457 may be a cam mechanism (not shown) disposed in the housing. The cam mechanism is configured to abut the protuberances 453 extending outwardly from the piston member 448 through the second portion 419 of the differential case 417 and urge the piston member 448 in the second axial direction, causing the disconnect device 440 to be engaged. It should be appreciated that various other actuators 470 may be employed in the actuator assembly 457 as desired to abut the protuberances 453 extending outwardly from the piston member 448 through the second portion 419 of the differential case 417 and urge the piston member 448 in the second axial direction, causing the disconnect device 304 to be engaged.

In operation, the electric motor 404 outputs torque to the differential 416 via the at least one compound idler assembly 414. A default state of the disconnect device 440 is the disengaged position. As such, the piston member 448 is in the first position. Hence, the vehicle 10 is driven solely by the internal combustion engine 12.

When the operator desires the vehicle 10 to be at least partially driven by the electric drive axle 400, a controller (not shown) transmits a signal to the actuator assembly 457. The actuator assembly 457 causes the piston member 448 to linearly move in the second axial direction from the first position to the second position thereof. When the piston member 448 is in the second position, the protuberances 450, 451 are in meshed engagement and the disconnect device 440 is in the engaged position. When the disconnect device 440 is in the engaged position, the compound idler assemblies 410, 405 transfer torque from the electric motor 404 to the differential 416. The differential 416 then transfers the torque to the first and second axle shafts 16, 18 via the meshed engagement of the pinion gears 426 and the side gears 430, 432. When the electric drive axle 400 is in a power generation mode, the torque transfer described above is reversed.

When the operator no longer desires the vehicle 10 to be at least partially driven by the electric drive axle 400, the controller transmits a signal to the actuator assembly 457. The actuator assembly 457 causes the piston member 448 to linearly move in the first axial direction from the second position to the first position thereof. When the piston member 448 is in the first position, the protuberances 450, 451 are spaced apart from each other and the disconnect device 440 is in the disengaged position. When the disconnect device 440 is in the disengaged position, the compound idler assemblies 410, 405 do not transfer torque from the electric motor 404 to the first and second axle shafts 16, 18 via the differential 416.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A system, comprising:
an electric drive axle comprising an electric motor, a gear arrangement, a differential, and a disconnect device, wherein the gear arrangement comprises a first planetary gear system and a second planetary gear system and is configured to produce a certain gear ratio between the electric motor and the differential, and wherein a pinion sleeve is in face-sharing contact with an interior of a case of the differential, wherein the disconnect device comprises a piston member concentrically arranged within an annular hub and the pinion sleeve, wherein the piston member is configured to move in a first axial direction away from the pinion sleeve during disengagement of the disconnect device via a force.

2. The system of claim 1, wherein the first planetary gear system is configured to produce a reduction in a gear ratio between the electric motor and the secondary planetary gear system.

3. The system of claim 2, wherein the second planetary gear system is configured to produce a reduction in a gear ratio between the first planetary gear system and the differential.

4. The system of claim 1, wherein a protuberance extends radially inward from the annular hub.

5. The system of claim 1, wherein the force is provided by a biasing member, the biasing member is a spring or a passage configured to receive a hydraulic fluid.

6. The system of claim 5, wherein the hydraulic fluid is directed from a motor cooling fluid circuit.

7. The system of claim 1, wherein the piston member is configured to move in a second axial direction, opposite the first axial direction, toward the pinion sleeve during engagement of the disconnect device in an absence of the force from the biasing member.

8. An electric drive axle, comprising:
an electric motor, a gear arrangement, a differential, and a disconnect device, wherein the gear arrangement is configured to produce a certain gear ratio between the electric motor and the differential, wherein the gear arrangement comprises a first planetary gear system and a second planetary gear system, and wherein the disconnect device is disposed within an annular hub and a pinion sleeve, the pinion sleeve arranged in face-sharing contact with an interior of a case of the differential, wherein the disconnect device comprises a piston member concentrically arranged within the annular hub and the pinion sleeve, and wherein the piston member comprises a tab or a spline extending radially outward therefrom, and wherein the tab or the spline cooperates with a protuberance arranged on an inner peripheral surface of the annular hub to militate against a rotational movement of the piston member relative to the case.

9. The electric drive axle of claim 8, wherein the piston member comprises a plurality of protuberances that are configured to engage with a plurality of protuberances of extending axially outward from an outboard surface of the pinion sleeve in a meshed manner when the disconnect device is in an engaged position.

10. The electric drive axle of claim 9, wherein the plurality of protuberances of the piston member are spaced apart from the plurality of protuberances of the pinion sleeve when the disconnect device is disengaged.

11. The electric drive axle of claim 10, wherein a vehicle is not driven by the electric drive axle when the disconnect device is disengaged, and wherein the vehicle is driven by the electric drive axle when the disconnect device is engaged.

12. A hybrid vehicle, comprising:
an electric drive axle comprising an electric motor, a gear arrangement, a differential, and a disconnect device, wherein the gear arrangement is configured to produce a certain gear ratio between the electric motor and the differential, wherein the gear arrangement comprises a first planetary gear system and a second planetary gear system, and wherein the disconnect device is disposed within an annular hub and a pinion sleeve, wherein the pinion sleeve is in face-sharing contact with an interior of a case of the differential, wherein the disconnect device comprises a piston member concentrically arranged within the annular hub and the pinion sleeve, the piston member configured to move to a first position or a second position in response to a force of a fluid in a chamber, and wherein the first position is a disengaged position and wherein the second position is an engaged position, and wherein the piston member is moved to the first position in response to the fluid being absent from the chamber.

13. The hybrid vehicle of claim 12, wherein the piston member is moved to the second position in response to fluid flowing to the chamber.

14. The hybrid vehicle of claim 12, wherein a spacer is arranged axially adjacent the piston member within the annular hub, and wherein the space functions as an abutment for a biasing member disposed between the piston member and the pinion sleeve, and wherein the biasing member provides a force against the piston member toward the first position, and wherein the force of the fluid is greater than the force of the biasing member, and wherein the biasing member is a spring or a passage configured to receive a fluid.

15. The hybrid vehicle of claim 12, wherein the fluid is one or more of a cooling fluid from the electric motor, a lubricating fluid from a gearbox of the electric drive axles, and a hydraulic fluid from a hydraulic manifold.

* * * * *